(12) United States Patent
Uetsuka et al.

(10) Patent No.: US 6,549,696 B1
(45) Date of Patent: Apr. 15, 2003

(54) OPTICAL WAVELENGTH MULTIPLEXER/ DEMULTIPLEXER

(75) Inventors: Hisato Uetsuka, Hitachi (JP); Masahiro Okawa, Hitachi (JP); Koichi Maru, Hitachi (JP); Hideki Nounen, Hitachi (JP); Tatsuo Teraoka, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 09/634,581

(22) Filed: Aug. 8, 2000

(30) Foreign Application Priority Data

| Aug. 10, 1999 | (JP) | ............................................. 11-226875 |
| Sep. 29, 1999 | (JP) | ............................................. 11-276802 |
| Oct. 21, 1999 | (JP) | ............................................. 11-299832 |
| Nov. 11, 1999 | (JP) | ............................................. 11-321246 |

(51) Int. Cl.$^7$ ................................................. G02B 6/28
(52) U.S. Cl. ............................... 385/24; 385/37; 385/46; 359/124
(58) Field of Search .................... 385/24, 37, 129–131; 359/124, 127, 130, 165

(56) References Cited

U.S. PATENT DOCUMENTS 5,706,377 A * 1/1998 Li ............................... 385/14
5,799,118 A * 8/1998 Ogusu et al. ................. 385/14
5,905,824 A * 5/1999 Delisle et al. ................. 385/15
6,069,990 A * 5/2000 Okawa et al. ............... 359/115
6,195,481 B1 * 2/2001 Nakajima et al. ........... 359/115
6,195,482 B1 * 2/2001 Dragone ....................... 385/28
6,222,956 B1 * 4/2001 Akiba et al. .................. 385/24
6,222,963 B1 * 4/2001 Grand et al. .................. 385/37

* cited by examiner

Primary Examiner—Hemang Sanghavi
Assistant Examiner—Scott Knauss
(74) Attorney, Agent, or Firm—Antonelli, Terry, Stout & Kraus, LLP

(57) ABSTRACT

An optical wavelength multiplexer/demultiplexer includes a substrate, an input channel waveguide, an input slab waveguide, a channel waveguide array which has a plurality of channel waveguides, each channel waveguide differing in length from its neighboring waveguide by predetermined amount, an output slab waveguide, and a plurality of output channel waveguides. The input slab waveguide or output slab waveguide have a temperature compensation material, in its light path, having an opposite sign of diffraction temperature change to the plurality of channel wave guides, or a material capable of canceling a change in the in-phase plane of light having each wavelength which occurs in a vicinity of the channel waveguide array and the slab waveguide, or a waveguide for band width adjustment on which a waveguide to adjust band width of wavelength multiplexing light is provided.

24 Claims, 17 Drawing Sheets

FIELD DISTRIBUTION OF LIGHT

OPTICAL WAVELENGTH MULTIPLEXER/DEMULTIPLEXER

FIELD OF THE INVENTION

The present invention relates to an optical wavelength multiplexer/demultiplexer, and more particularly, relates to a temperature-unreliable, optical wavelength multiplexer/demultiplexer using an arrayed-waveguide diffraction grating (hereinafter, called as "channel waveguide array") composed of a plurality of channel waveguides having a silica glass as a core and having different length from each other, in which loss resulted of grooves that are formed on slab waveguide is reduced and of which spectrum response is optimized, and also relates to a channel waveguide array which is used for a wavelength-division multiplex transmission system.

BACKGROUND OF THE INVENTION

In the field of optical communication, a wavelength-division multiplexing transmission system that a plurality of signals are put on light having a plurality of wavelengths and the light loaded with the plurality of signals are transmitted through one optical fiber to increase optical communication capacity has been investigated and has been partially implemented in products. In the system, an optical wavelength-division multiplexer/demultiplexer for multiplexing or demultiplexing a plurality of signal lights plays an important role. Among others, an optical wavelength multiplexer/demultiplexer using a channel waveguide array can implement multiplexing/demultiplexing at a narrow wavelength spacing, and hence, can increase the number of multiplexing in communication capacity.

In FIGS. 1 and 2, the optical wave length multiplexer/dimultiplexer comprises a silica substrate 1, a channel waveguide array 3a composed of a plurality of the channel waveguides 3 provided on the substrate 1 in certain pattern, each channel waveguide being composed of cores 2 made of silica glass, and a cladding 4 made of a pure silica glass and provided on the substrate 1 so that the core 2 and the substrate 1 may be covered with the cladding. To the core, titanium oxide ($TiO_2$) is added. The channel waveguide 3 is formed by the core 2 and the cladding 4 and the channel waveguide array 3 has, for example, twenty-two channel waveguides 3. Each channel waveguide 3 of the channel waveguide array 3a has different length from each other so that it becomes longer from one end to the other end (longer side). The channel waveguide array 3a is expected as a key device for the wavelength multiplex transmission system in case that the number of channel is increased, because it can be manufactured by same process and steps regardless of the number of the channel and because deterioration of its characteristics such as loss is less in principle. With respect to a transmitting wavelength, a channel interval and a transmitting center wavelength can be generally set by 100 GHz (approximately, 0.8 nm) or its multiple in accordance with the international standard.

To both sides of the channel waveguide array 3a, a fan-shaped input slab waveguide 5 which may be called, hereinafter, as "input waveguide" and an fan-shaped output slab waveguide 6 which may be called, hereinafter, as "output waveguide" are connected. One input channel waveguide 7 is connected to the fan-shaped input slab waveguide 5 and a plurality of output channel waveguides 8-1~8-8.

In the above structure, signal lights including various wavelengths input in the input channel waveguide 7 are input through the fan-shaped input slab waveguide 5 in each core 2 of the channel waveguide array 3a. The signal lights input in the channel waveguide array 3a propagate through each core 2 to the fan-shaped output slab waveguide 6, in which a light-collecting position is shifted in the contact surface of the fan-shaped output slab waveguide 6 and the output channel waveguides 8-1~8-8 because in-phase plane is declined depending on the wavelengths. As a result, the output signal lights in the fan-shaped output slab waveguide 6 are selectively output to the output channel waveguides 8-1~8-8 in accordance with the shift condition of the in-phase plane, whereby signal lights having different wavelengths are output from the eight waveguides.

A length "L" of each channel waveguide 3 in the channel waveguide array 3a changes by thermal expansion and a refractive index of silica glass constituting the core 2 changes with a temperature change. Accordingly, if a temperature changes, for example, from 0° C. to 60° C., the in-phase plane 9 changes to the in-phase plane 10 as shown in FIG. 1. As a result, a light-collecting position is shifted in accordance with the temperature change, and wavelengths to be demultiplexed change.

In FIG. 3, "d" is a pitch of the channel waveguide in the channel waveguide array 3a and "θ" is an emerging angle of signal light from the channel waveguide to the output slab waveguide 6. If it is required to keep the in-phase plane shown in FIG. 1 to be continuous with respect to certain wavelength, the following equation has to be satisfied.

$$(2\pi/\lambda)N_{eff}\Delta L+(2\pi/\lambda)n_s\cdot d \sin \theta=2\pi m \quad (1)$$

wherein "λ" is a wavelength, "m" is the number of degree (m=1, 2, 3, ...), ΔL is a difference of length in the channel waveguide of the channel waveguide array 3a, $N_{eff}$ is an effective refractive index of the channel waveguide array 3a, and $n_s$ is an effective refractive index n of the fan-shaped output slab waveguide 6. The effective refractive indexes $N_{eff}$ and $n_s$ are equal to the refractive index of silica glass which is used in the channel waveguide array 3a as the core 2, and therefore, n is nearly equal to $N_{eff}$ and $n_s$, respectively. Thus, the following formula can be derived from the formula (1).

$$\Delta\theta/\Delta T=(1/n)\times(\delta n/\delta T)\times\Delta L/d \quad (2)$$

wherein "T" is a temperature, Δθ is change of light beam angle (i.e. change of in-phase plane) when change of the temperature is ΔT, and δn/δT is change of refractive index of the waveguide, and the influences of the thermal expansion are ignored because they are smaller than the change of refractive index. The change of wavelengths to be demultiplexed in accordance with the temperature change is represented by the following formula.

$$\Delta\lambda/\Delta T = (\lambda \times n \times d/n\Delta L)\times(\Delta\theta/\Delta T) \quad (3)$$

$$= (\lambda/n)\times(\delta n/\delta T)$$

For example, a value of Δλ/ΔT in silica glass to which titanium oxide ($TiO_2$) is added is 0.01 (nm/°C.), when n≈1.45, δn/δT≈1×10⁻⁵, λ=1550 nm. The optical part materials using such the channel waveguide array 3a are used under the temperature such as 0° C. to 60° C., in general.

As a result, the channel waveguide array 3a can not be used in practical system, because the wavelengths to be demultiplexed is shifted by 0.6 nm at maximum in case that the temperature changes from 0° C. to 60° C. In order to reduce the change of center wavelength due to temperature-reliability, it has been proposed that a wedge-shaped groove is provided in a part of the channel waveguide array 3a and an optical resin material is inserted in the groove.

A conventional optical wavelength multiplexer/dimultiplexer in which a wedge-shaped groove having an optical resin material is provided is shown in FIG. 4. A value represented by the formula (2) has to be smaller than a value represented by the formula (3) to reduce the change of center wavelength due to the temperature-reliability. For the purpose, the wedge-shaped groove having a maximum width W is provided in a part of the channel waveguide array 3a and the optical resin material is inserted in the groove. As a result, the shift of demultiplexed wavelengths due to the temperature-reliability in in-phase plane is canceled. This situation is represented by the following formula which is derived from the formula (2).

$$(\delta n/\delta T)\Delta L + (\Delta L' \times \delta n'/\delta T) = 0 \qquad (4)$$

wherein $\Delta L'$ is a width difference of each groove in channel waveguide array 3a and the channel waveguide has the width difference $\Delta L'$ from its neighboring channel waveguide in this order, n' is a refractive index of the optical resin, and $\delta n'/\delta T$ is a change of refractive index of the optical resin to temperature. For example, in case that a silicon resin is used as the optical resin material, $\delta n'/\delta T$ is the following value.

$$\delta n'/\delta T \approx -37 \times 10^{-5} [°C.^{-1}]$$

The change ($\delta n'/\delta T$) of refractive index of the silica glass reliable on temperature is nearly equal $1 \times 10^{-5}$ [°C.$^{-1}$] and therefore, $\Delta L'/\Delta L$ is the following value.

$$\Delta L'/\Delta L \approx 1/37 \qquad (5)$$

The length difference $\Delta L$ of neighboring channel waveguide is approximately 100 μm and hence, the width difference $\Delta L'$ of it is approximately 2 μm. However, the number of channel waveguides in channel waveguide array 3a is 100 to 200 and hence, the maximum width W of the optical resin material 12 is 400 μm.

The length of channel waveguide 3 is designed so that it becomes longer by same length difference $\Delta L$ from inside channel waveguide to outside channel waveguide.

Accordingly, phase change amount $\Phi'_m (\lambda)$ which light wave transmitting through channel waveguide 3 of i-th order from the most inside (shortest) channel waveguide 3 receives can be obtained by the formula based on the channel waveguide 3 existed in the most inside.

$$\Phi'_m(\lambda) = 2\pi n_a \cdot i \Delta L/\lambda \qquad (6)$$

wherein $\lambda$ is a wavelength of light wave in vacuum and $n_a$ is effective refractive index of channel waveguide 3.

According to the formula, the effective refractive index of light wave in the vicinity of the connecting face of the channel waveguide 3 and the output slab waveguide 6 declines depending on the wavelength, and the light wave subjected to the phase change by each channel waveguide 3 is interfered in the output slab waveguide 6 and the interfered wave is output from the output channel waveguide 7.

In case that wavelength changes, the light-collecting position is shifted in the connecting face of the output slab waveguide 6 and the output channel waveguide 8, because a direction of the in-phase plane is different by wavelength. Accordingly, the light wave having different wavelength can be taken from each output channel waveguide, whereby light multiplex/demultiplex can be realized. The wavelength $\lambda$ emerged from the output channel waveguide 8 provided on a symmetrical axis 11 of the output slab waveguide 6 is represented by the formula.

$$\lambda = n_a \Delta L/m \qquad (7)$$

wherein "m" is a diffraction degree.

In case that a light circuit is constructed by a normal material, a refractive index of the material changes by thermo-optical effects due to temperature change to change na, and a length of the channel waveguide 3 changes by a thermal expansion to change $\Delta L$. Accordingly, the in-phase plane of light wave in the vicinity of the connecting face of the channel waveguide 3 and the output slab waveguide 6 declines depending on the temperature to change the output wavelength.

On the other hand, in case that temperature changes by $\Delta T$ in the light wave which is output from the output channel waveguide provided on a symmetrical axis 11 of the output slab waveguide 6, the wavelength change amount $\Delta \lambda$ is calculated by the formula (8) which is obtained by differentiating the formula (7) by T.

$$\Delta \lambda = \Delta L/m[dn_a/dT + n_a \cdot 1/\Delta L \cdot d(\Delta L)/dT]\Delta T \qquad (8)$$
$$= \lambda/n_a[dn_a/dT + n_a \cdot 1/\Delta L \cdot d(\Delta L)/dT]\Delta T$$

If the light circuit is constituted by a silica material and $dn_a/dT$ is equal to a temperature coefficient of the silica material in the formula (8), $dn_a/dT$ is nearly $1 \times 10^{-5}$ [°C.$^{-1}$], $1/\Delta L \cdot d(\Delta L)/dT$ is nearly $5 \times 10^{-7}$ and $n_a$ is nearly 1.45, and hence, $\Delta \lambda/\Delta T$ is nearly equal to 0.01 (nm/°C.) when $\lambda$ is 1550 (nm). Therefore, if the optical wavelength multiplexer/demultiplexer is used at 0° C. to 60° C., its wavelength is shifted by 0.6 nm at maximum. It is impossible to use the multiplexer/demultiplexer as practical system under such wavelength sift, and it is necessary to control the temperature of light circuit in order to resolve the problems.

An electric power has to be supplied to the channel waveguide array 3a using a silica material which has a temperature coefficient of approximately 0.01 (nm/°C.), because an active control system that the center wavelength is set by using a heater (not shown) or a Peltier element (not shown) is applied. Such system requires expensive cost. An optical wavelength multiplexer/demultiplexer using temperature-unreliable, channel waveguide array has been investigated (Inoue et al., Shingakukai Sogo Taikai C-3-117 (1998)). According to the investigation, a groove (not shown) is formed on the channel waveguide array 3a by etching, and a resin material having a temperature coefficient opposite to that of silica is inserted in the groove to make the transmitting wavelength to be temperature-unreliable. Further, according to it, the center wavelength is not precisely adjusted by using a heater or Peltier element because a waveguide element is temperature-unreliable. Therefore, the input optical fiber 7a is directly connected to the end 25 of the input slab waveguide 5 as shown in FIG. 5, and the center wavelength is controlled by adjusting the connecting position of the fiber 7a.

An example of conventional optical wavelength multiplexer/demultiplexer that the wavelength shift is reduced and the temperature control is omitted is shown in FIG. 4. A groove 12 is provided on a part of the channel waveguide 3 and the material having different temperature coefficient of refractive index from that of light circuit is filled in the groove to cancel a decline of in-phase plane due to temperature. This is written in Y. Inoue et al. "A thermal silica-based arrayed-waveguide grating (AWG) multiplexer" ECOC 97 technical digest, pp. 33 to 36, 1997. However, according to the method, it is the problem that diffraction loss becomes more by the groove 12, because the groove 12 is provided in the way of the channel waveguide 3 having a two-dimensionally light-enclosing effect.

The optical wavelength multiplxer/demultiplexer is shown in FIG. 6, which is proposed to reduce the diffraction loss in the groove. The groove 20 is provided on the input slab waveguide 5 or the output slab waveguide 6 and the material having different temperature coefficient of refractive index from that of light circuit is filled in the groove. There are advantages that increase of the diffraction loss can be controlled, because it is one dimensional light that is shut in the slab waveguide 5, 6.

In a conventional optical multiplexer/demultiplexer, if it is constructed by several hundreds of waveguides, the maximum width W of the wedge-shape groove reaches several hundreds μm and thus, diffraction loss is increased and an additive loss of approximately 4 to 6 dB is generated. And, a groove width of not more than sub-micron meter, which is smoothly changed with high accuracy is required in order to obtain good demultiplex characteristics having small cross-talk. However, if the groove is provided in such wide range as conventional one, cross-talk is deteriorated because it is difficult to increase production accuracy of the groove.

According to another conventional optical multiplexer/demultiplexer having the grooves 20 in the input slab waveguide 5 as shown in FIG. 6 and the channel waveguide array 3a as shown in FIG. 9, increase of the diffraction loss is not sufficiently protected because a width of the grooves in the input slab waveguide 5 has to be substantially same as those in the channel waveguide array 3a. Accordingly, it is difficult to constitute optical multiplexer/demultiplexer which is practically durable, and the problems in spectrum response of light wave occur. The degree of influence to the loss by the grooves 20 is shown in FIG. 7 (without groove 20) and FIG. 8 (with groove 20) in which design value is obtained by a beam propagation method. The minimum loss in the design value is set so that it is consistent with that in the measured value. In FIG. 7 (without groove 20), the graph shape of the passing region (main loop) A in the design value is substantially same as that in the measured value, and the minimum loss is 4.3 dB. On the other hand, in FIG. 8 (with groove 20), the graph shape of the passing region in the design value is broader than that in the measured value, and the minimum loss is 7.1 dB.

The problem of the spectrum response is illustrated in FIG. 9. An aberration occurs between the light wave emanating from the point "O" corresponding to the exit of the input channel waveguide 7 and propagating in the vicinity of the center of the groove 20, and the light wave emanating from the point "O" corresponding to the exit of the input channel waveguide 7 and propagating apart from the center of the groove 20, because the refractive angles $\theta_1$ and $\theta_2$ are different from each other. Accordingly, if the light wave emanates with keeping the aberration, the spectrum response of the light wave in the optical multiplexer/demultiplexer with the grooves provides more discrepancy than that in the optical multiplexer/demultiplexer with no groove.

According to the conventional optical wavelength multiplexer/demultiplexer with the grooves 20 on the slab waveguide 5 or 6 as the above illustration, it is difficult to keep the loss due to the groove 20 lower and problems exist in the spectrum response, and therefore, it is difficult to make practical use of it at present.

Further, if the input optical fiber is directly connected to the end surface of the slab waveguide, there is a problem that it is hard to optimize distribution of electric fields to provide wide and flat band width or low cross-talk by introducing a Y-branch type waveguide, a parabolic hone type waveguide or a taper type waveguide in front of the slab waveguide. And, when the optical fiber is set on the end surface of the slab waveguide, there is another problem that the discrepancy of the axis has to be within the range of sub μm and several μm in order to accurately set the center wavelength.

SUMMARY OF THE INVENTION

A first object of the invention is to provide an optical wavelength multiplexer/demultiplexer with a reduced additive loss and less deteriorated cross-talk.

A second object of the invention is to provide an optical wavelength multiplexer/demultiplexer with less increase of loss caused by grooves and with optimized spectrum response.

A third object of the invention is to provide a temperature-unreliable, optical wavelength multiplexer/demultiplexer capable of finely adjusting set of the center wavelength and optimizing electric field distribution of the signal lights in the channel waveguide array to expand a band width and to provide a flatter loss or to reduce a cross-talk.

A fourth object of the invention is to provide an optical wavelength multiplexer/demultiplexer capable of providing a flatter loss in a wider band width and accurately setting the center wavelength, and having low cross-talk.

The objects of the invention can be attained in accordance with the each feature of the present invention.

According to the feature of the invention, is an optical wavelength multiplexer/demultiplexer includes an optical wavelength multiplexer/demultiplexer including a substrate; an input channel waveguide provided on the substrate; an input slab waveguide of which one end is connected to the input channel waveguide; a channel waveguide array of which one side is connected to the other side of the input slab waveguide and which has a plurality of channel waveguides, each of the plurality of channel waveguides differing in length from its neighboring waveguide by a predetermined amount; an output slab waveguide of which one side is connected to the other side of the channel waveguide array; and a plurality of output channel waveguides which are connected to the other side of the output slab waveguide; wherein said input slab waveguide or output slab waveguide having one of a temperature compensation material, in its light path, having an opposite sign of refractive index-temperature change to the plurality of channel waveguides; a material capable of canceling change in in-phase plane of light having each wavelength which occurs in the vicinity of the channel waveguide array and the slab waveguide, the material being provided in the curved form so that it may cross the light traveling direction, and a waveguide element for band width adjustment on which a waveguide to adjust band width of wavelength multiplexing light is provided.

The thickness of the temperature compensation material provided on the input slab waveguide or output slab waveguide is thinner than the thickness of the temperature compensation material provided on the channel waveguide array. As a result, the additive loss and cross-talk are reduced.

A preferred embodiment in the feature of the invention is that the temperature compensation material is a wedge-shaped multi-component glass material is provided in the light path of the input slab waveguide or output slab waveguide. Another preferred embodiment of the invention is that a wedge-shaped optical resin is provided in the light path of the input slab waveguide or output slab waveguide.

A preferred embodiment of the invention is that the input slab waveguide or output slab waveguide is composed of a curved groove crossing the light traveling direction, and a filler which is filled in the curved groove and which has a temperature incline of refractive index different from that of the materials making up the input slab waveguide or output slab waveguide including the curved groove.

It is preferred in the structure that the curved groove is provided so that a center of curvature in the wall surface of the groove exists in the vicinity of the face between the input slab waveguide and the input channel waveguide, or between the output slab waveguide and the output channel waveguide. It is preferred that the number of the curved grooves is a plurality, and that the curved grooves are disposed in the light traveling direction. It is preferred that a width of the groove is smaller and a plurality of the grooves are provided, because increase of the loss is restrained.

As the examples of the material capable of canceling the change in in-phase plane of each wavelength light caused by temperature change and the filler which is filled in the curved groove, there are an optical resin including a silicon resin, an epoxy resin and a polymethyl methacrylate resin, or a multi-component glass material including sodium, potassium and calcium. As the examples of the material constituting the input and output slab waveguides, the input and output channel waveguides and the channel waveguides of the channel waveguide array is a silica material. In case that the slab waveguide made of the optical resin and the silica material is combined, particularly marked advantages can be obtained because the optical resin provides a negative refractive index-temperature change and the silica material provides a positive refractive index-temperature change, whereby the optical wavelength multiplexer/demultiplexer becomes temperature-unreliable.

By the waveguide element for band width adjustment, set of the center wavelength is finely adjusted, electric field distribution of the signal light in the channel waveguide array is optimized, a band width is expanded, a flatter loss is provided and a cross-talk is reduced. The waveguide element for band width adjustment can be provided with the waveguide of which one end is expanded in the taper-shaped or in the parabolic hone-shaped toward light emanating side. In the structure, it is also possible that the input slab waveguide is divided into twoparts, one of the divided parts existing in the entrance side thereof is provided with the waveguide element for band width adjustment, and the other of the divided parts existing in the emanating side thereof is provided on the substrate. And, the waveguide element for band width adjustment can be provided with a slit which exists in the waveguide thereof and is expanded in the entrance and emanating direction.

In the structure, the optical wavelength multiplexer/demultiplexer can be provided with a plurality of additive waveguides in the vicinity of the waveguide element for band width adjustment and the output waveguides. It is preferred that each of the waveguide is temperature-unreliable. According to the structure, a position and a shape of the waveguide element for band width adjustment are optimized by providing it between the input optical fiber and the input slab waveguide, whereby adjustment of wave shape (e.g adjustment to wider band width) can be implemented. Further, by providing the additive waveguides between the waveguide for band width adjustment and the output waveguide, the center wavelength can be accurately set, even if the axis of the element is shifted when the element is fixed.

BRIEF DESCRIPTION OF THE DRAWINGS

FIG. 32(*b*) is an enlarged plane view showing the waveguide element for band width adjustment in the invention shown in FIG. 32(*a*).

FIG. 32(*c*) is a partially enlarged plan view showing the area A of the optical wavelength multiplexer/dimultiplexer in the invention shown in FIG. 32(*a*).

FIG. 32(*d*) is an enlarged plan view showing the area B of the optical wavelength multiplexer/dimultiplexer in the invention shown in FIG. 32(*a*).

FIG. 32(*e*) is a partially enlarged plan view showing the area C of the optical wavelength multiplexer/dimultiplexer in the invention shown in FIG. 32(*a*).

FIG. 32(*f*) is a vertical sectional view taken along the line D—D of the optical wavelength multiplexer/dimultiplexer in the invention shown in FIG. 32(*a*).

DESCRIPTION OF THE PREFERRED EMBODIMENTS

Figure 1:
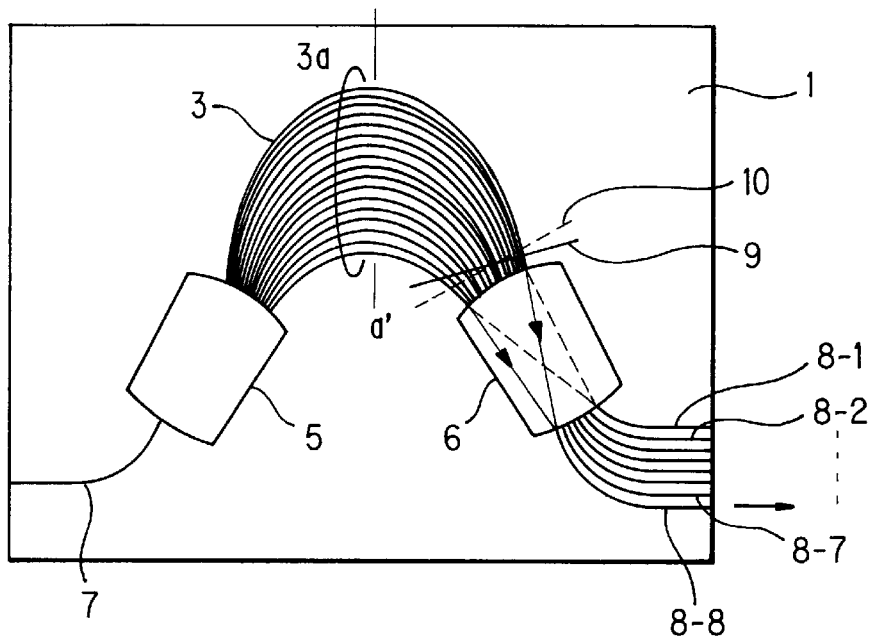
FIG. 1 is a plan view showing a conventional optical wavelength multiplexer/dimultiplexer using a channel waveguide array.
Figure 2:
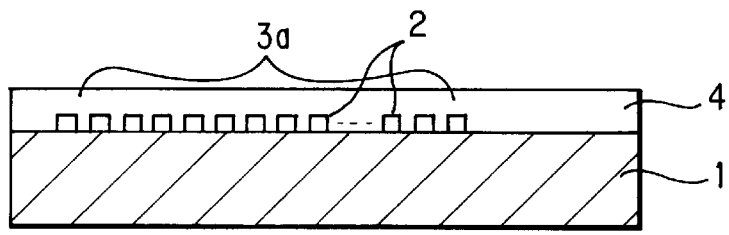
FIG. 2 is a vertical sectional view taken along the line a–a' of FIG. 1.
Figure 3:
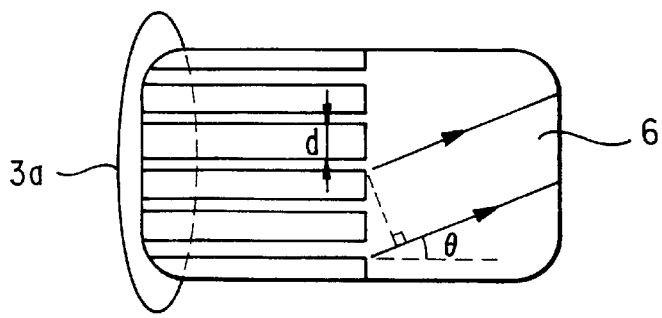
FIG. 3 is a partially enlarged view showing the detail in the contact position of the channel waveguide array and the fan-shaped output slab waveguide of FIG. 1.
Figure 4:
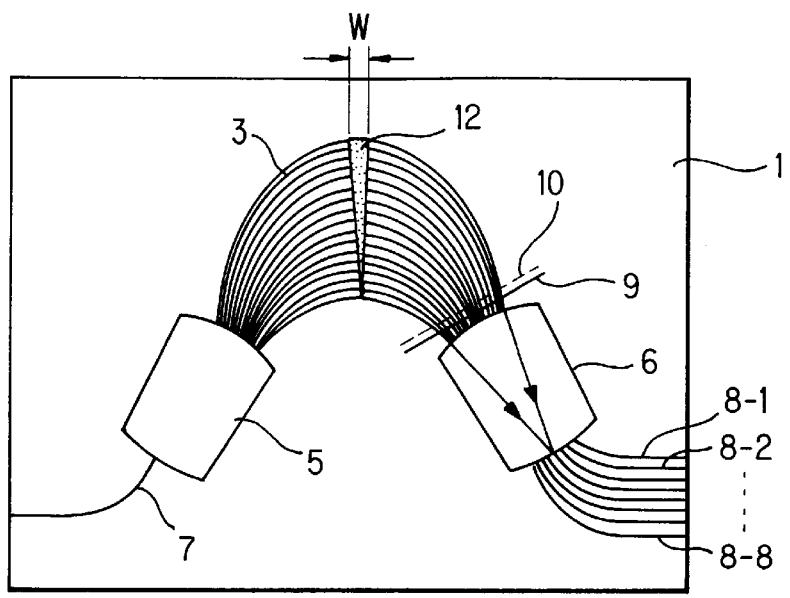
FIG. 4 is a plan view showing another conventional optical wavelength multiplexer/dimultiplexer.
Figure 10:
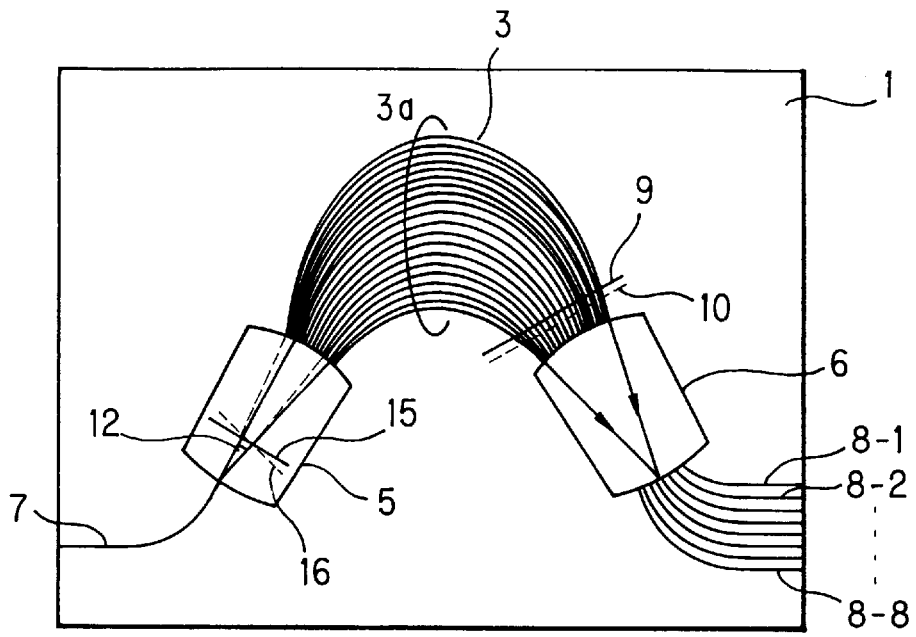
FIG. 10 is a plan view showing the first embodiment of the temperature-unreliable, optical wavelength multiplexer/dimultiplexer in the invention.

The first embodiment of the optical multiplexer/demultiplexer in the invention which is unreliable on temperature is shown in FIG. 10. The channel waveguide array 3*a* having vertical sectional shape as shown in FIG. 2 is provided in the form of half circle on the substrate 1 made of a silica glass or silicon. The fan-shaped input slab waveguide 5 (input waveguide) and the fan-shaped output slab waveguide 6 (output waveguide) are connected to the opposite ends of the channel waveguide array 3*a*. One input channel waveguide 7 is connected to the input slab waveguide 5 and a plurality of the output channel waveguides 8-1 to 8-8 are connected to the output slab waveguide 6. The wedge-shaped optical resin material 12 such as a silicon resin or epoxy resin as the temperature compensation material is provided in the input slab waveguide 5. Whether wider width side of the optical resin material 12 is provided in outside or inside of the channel waveguide array 3*a* is determined by a sign of refractive index-temperature change of the silica glass used as the core 2. In FIG. 10, the wider width side of the optical resin material 12 is provided in outside of the channel waveguide array 3*a*.

Figure 11:
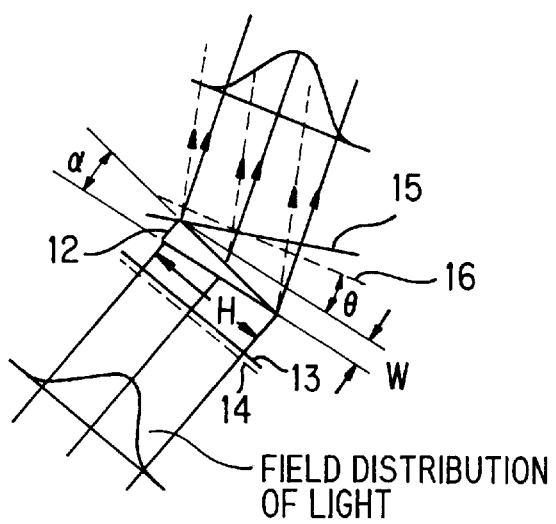
FIG. 11 is an illustrative view showing fundamental behavior in the temperature-unreliable, optical wavelength multiplexer/dimultiplexer shown in FIG. 10.

A solid line is an in-phase plane at 0° C. and a dotted line is an in-phase plane at 60° C. in FIG. 11 as well as in FIG. 10. A light launched from the input channel waveguide 7 to the input slab waveguide 5 propagates along the input slab waveguide 5 and reaches the optical resin material 12 provided therein. In the case, the in-phase planes 13 (at 0° C.) and 14 (at 60° C.) of the input slab waveguide 5 existed in the incident side of the optical resin material 12 are in the same position. On the contrary, the in-phase planes 15 (at 0° C.) and 16 (at 60° C.) of the input slab waveguide 5 existed in the emanating side of the optical resin material 12 are set so that each position of the in-phase planes 9 (at 0° C.) and 10 (at 60° C.) shown in FIG. 10 is not changed. Thus, even if temperature changes, a temperature-unreliable, optical multiplexer/demultiplexer is obtained by making the refractive index-temperature change of the optical resin material 12 opposite to that of the waveguides in the input slab waveguide 5 and the channel waveguide array 3*a*.

The light passed through the optical resin material 12 is launched to the channel waveguide array 3*a* and is passed through each core 2. The in-phase planes at the exit of the channel waveguide array 3*a* are constant, even if temperature changes. That is, even if temperature around the channel waveguide array 3*a* changes, a light-collecting position by each core 2 in the channel waveguide array 3*a* is not shifted and the demultiplexed wavelength changes. A result of quantitative consideration of optical multiplexer/demultiplexer of the invention will be explained below.

In FIG. 11, an angle of the optical resin material 12 is "α" and an angle of light wave surface after the light is passed through the optical resin material 12 is "θ". Angles of the in-phase planes 15 and 16 change, because a refractive index "n'" of the optical resin material 12 is different from a refractive index "n" of silica glass in the channel waveguide array 3*a*. The value "θ" is given by the following formula.

$$\theta = \alpha(n'-n)/n' \quad (9)$$

wherein θ<<1 and α<<1.

The formula is differentiated by temperature "T" to obtain the change in the angle "θ" of the in-phase plane to the temperature as shown by the formula.

$$\Delta\theta/\Delta T = \alpha(1/n') \times (\delta n'/\delta T) \quad (10)$$

wherein $\delta n'/\delta T >> \delta n/\delta T$ and n'≈n, because $\Delta\theta/\Delta T \approx 1 \times 10^{-5}$ and $\delta n'/\delta T \approx -37 \times 10^{-5}$ [°C.$^{-1}$].

From the formula (2) as above, the change "Δθ/ΔT" in the angle of the in-phase plane to the temperature in the channel waveguide array 3a becomes 4×10⁻⁵ [rad/°C.], when ΔL=120 μm, n=1.45, δn/δT≈1×10⁻⁵ [°C.⁻¹] and d=120 μm.

The angle "α" of the optical resin material 12 is 0.15 (rad) from the formula (10), when δn'/δT≈−37×10⁻⁵ [°C.⁻¹]. When a length "H" of the optical resin material 12 is 60 μm, a width "W" of the optical resin material 12 is 9 μm which is much smaller than conventional value (400 μm)

Figure 12:
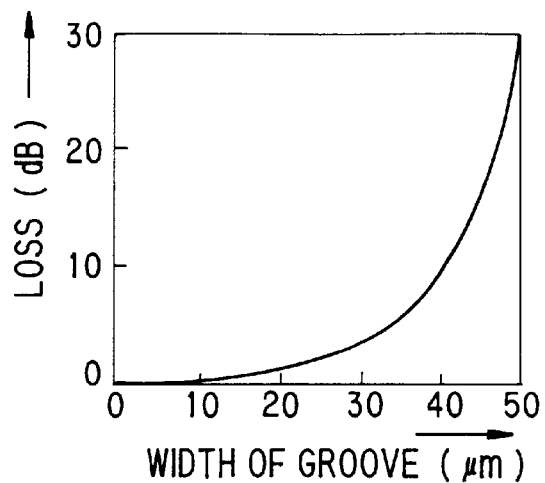
FIG. 12 is a graph showing a relationship between a width of groove and a loss in the channel waveguide.

A relationship between the width of the groove and the loss of wavelength characteristics in the channel waveguides is shown in FIG. 12. The loss is exponential—functionally increased to the width of the groove as shown in FIG. 12. Accordingly, the loss is much reduced in case that the width of the groove is smaller in the invention. A function to enclose the light exists only in the direction of the thickness of the waveguides (in other words, it does not exist in the direction of the width). Therefore, even if the light diffracts in some extent by the optical resin material 12, the loss is only in the light power emanating to the upper and lower directions of the cladding. As a result, the loss in the direction of the thickness can be controlled to the value of not more than 0.2 dB and the loss is much reduced in comparison with conventional optical multiplexer/demultiplexer.

Figure 13:
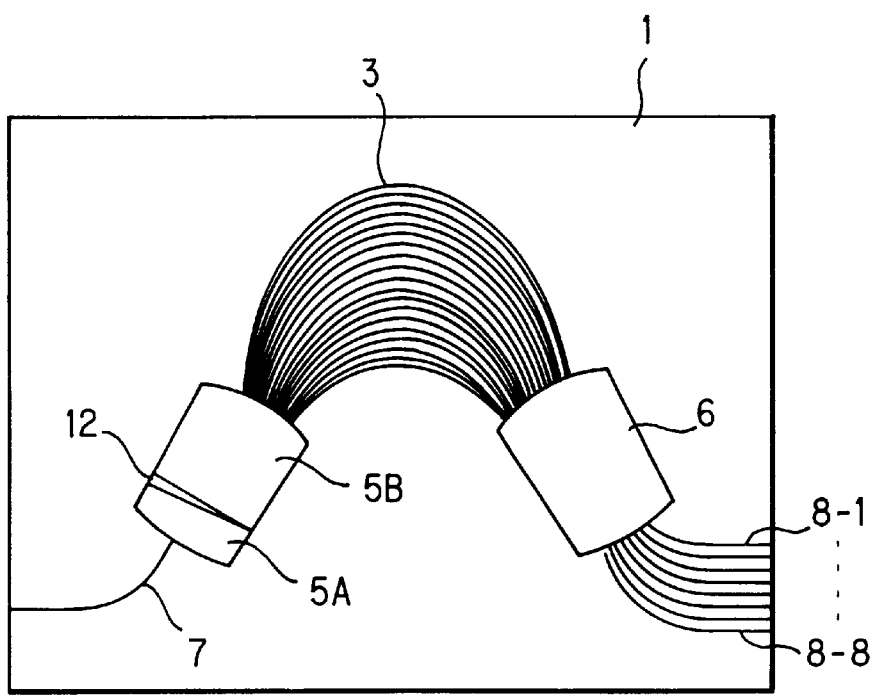
FIG. 13 is a plan view showing the second embodiment of the temperature-unreliable, optical wavelength multiplexer/dimultiplexer in the invention.

The second embodiment of the temperature-unreliable, optical multiplexer/demultiplexer in the invention is shown in FIG. 13, in which an optical resin material 12 is used instead of the optical resin material 12 shown in FIG. 10. In FIG. 13, the fan-shaped input slab waveguide 5 is divided into two (i.e. slab waveguides 5A and 5B), a slit is provided therebetween, and the optical resin material 12 is provided in. the slit. Silicon and epoxy resin are used as the optical resin material 12. Whether wider width side of the optical resin material 12 is provided in outside or inside of the channel waveguide array 3a can be determined by the same manner as in the optical resin material 12 in FIG. 10.

Figure 14:
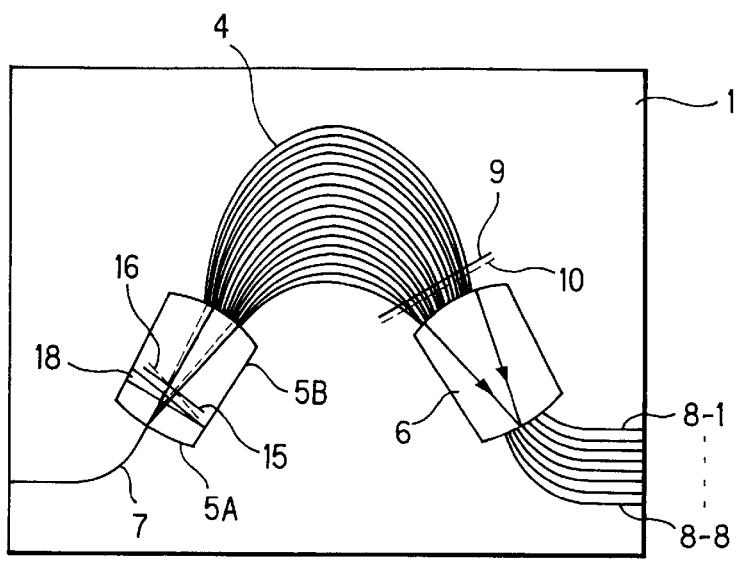
FIG. 14 is a plan view showing the third embodiment of the temperature-unreliable, optical wavelength multiplexer/dimultiplexer in the invention.

The third embodiment of the temperature-unreliable, optical multiplexer/demultiplexer in the invention is shown in FIG. 14, in which a multi-component glass material 18 is used as a temperature compensation material instead of the optical resin material 12 in FIG. 13. The multi-component glass material 18 which has a refractive index of n'≈1.55 and a temperature coefficient of δn'/δT≈−10×10⁻⁵ is fixed in the slit 26 by an optical adhesive. The wider width side of the multi-component glass material 18 is set so that it is located in the outside (longer side) of the channel waveguide array 3a in FIG. 14, and whether wider width side of the multi-component glass material 18 is provided in outside or inside of the channel waveguide array 3a can be determined by refractive index-temperature change characteristics of the multi-component glass material 18 and refractive index-temperature change characteristics of the silica glass in the channel waveguide array 3a. In the embodiment, the wider width side of the multi-component glass material 18 is located in the outside (longer side) of the channel waveguide array 3a, because the refractive index-temperature change characteristics of the multi-component glass material 18 is opposite to the refractive index-temperature change characteristics of the waveguides in the channel waveguide array 3a. Whole fundamental behavior in FIG. 14 is same as in FIG. 11.

An angle "α" of the multi-component glass material 18 is 0.36 (rad) from the formula (7), when Δθ/ΔT=4×10⁻⁵, ΔL=120 μm, n=1.45, δn/δT≈1×10⁻⁵, δn'/δT≈−10×10⁻⁵ and d=120 μm. In the case, when a length "H" of the multi-component glass material 18 is 60 μm, a maximum width "W" of the multi-component glass material 18 is 33 μm which is much smaller than conventional value (400 μm).

As shown in FIG. 12, the loss in the channel waveguides is exponential-functionally increased to the width of the groove by the diffraction of the light. Accordingly, the loss is much reduced because the volume to be occupied in the multi-component glass material 18 is smaller in the invention. A function to enclose the light exists only in the direction of the thickness of the waveguides (in other words, it does not exist in the direction of the width) in the fan-shaped input slab waveguide 5 to which the multi-component glass material 18 is fixed. Therefore, even if the light is diffracted in some extent by the multi-component glass material 18, the loss is only in the light power emanating to the upper and lower directions of the cladding. As a result, the loss in the direction of the thickness can be controlled to the value of not more than 0.5 dB.

A graph of the wavelength-loss characteristics of the optical wavelength multiplexer/dimultiplexer of the third embodiment in the invention is shown in FIG. 15.

Figure 15A:
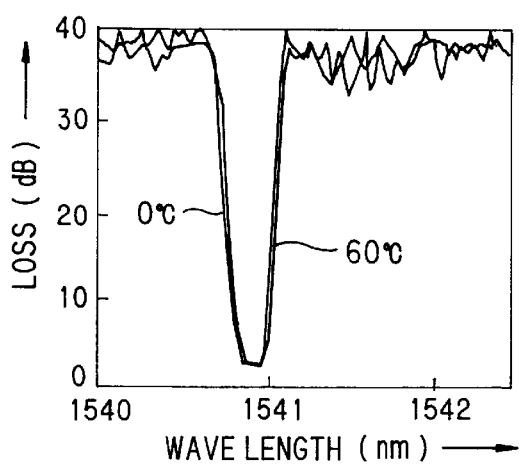
FIG. 15 is a graph showing a relationship between a wavelength and a loss in the optical wavelength multiplexer/dimultiplexer of the third embodiment in the invention shown in FIG. 14.
Figure 15B:
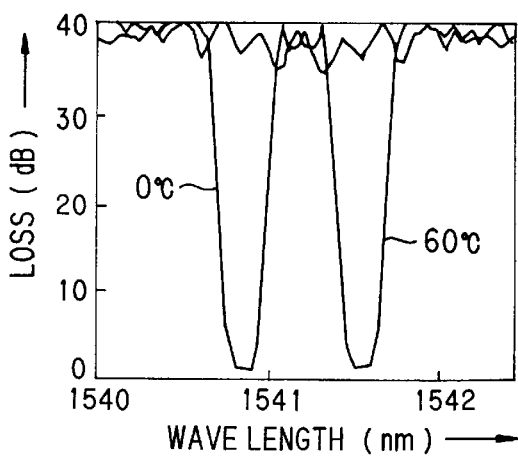

A graph of the wavelength-loss characteristics with the multi-component glass material 18 is shown in FIG. 15(a) and a graph of the wavelength-loss characteristics without the multi-component glass material 18 is shown in FIG. 15(b). It is apparent from FIG. 15(a) that temperature change of demultiplexed wavelength is very small by using the multi-component glass material and that the reduced loss is realized because the change of the loss which is found in FIG. 15(b) is not found in the passing region. Further, it is not necessary to form grooves in the wide range in comparison with conventional one, and deterioration of crosstalk does not cause because highly precise surface treatments of not more than 0.01 μm can be done by abrasion, etc.

In the embodiments of the invention as above, the optical resin material 12 and the multi-component glass material 18 are provided in the input slab waveguide 5, but they can be provided in the end of the output slab waveguide 6. The input slab waveguide 5 is divided into two parts to provide therein the optical resin material 12 and the multi-component glass material 18 therein, but is not limited, and the groove is made, for example, by a laser treatment.

Figure 16:
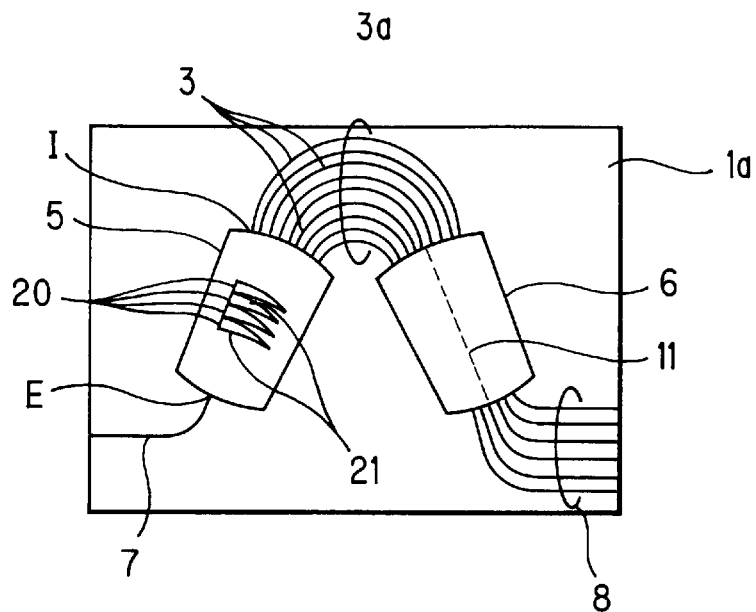
FIG. 16 is a plan view showing the fourth embodiment of the optical wavelength multiplexer/dimultiplexer in the invention.

The fourth embodiment of the optical multiplexer/demultiplexer in the invention will be explained in FIG. 16. In FIG. 16, "1a" designates a substrate on which the core of silica having a light circuit is provided and then a cladding layer of silica is provided as shown in FIG. 2; "3a" designates a channel waveguide array in the center of the light circuit, which is constituted by a plurality of curvature channel waveguides 3; "7" designates an input channel waveguide provided in the input end of the channel waveguide array 3a; "8" designates an output channel waveguide provided in the output end of the channel waveguide array 3a; "5" designates an input slab waveguide provided between the input channel waveguide 7 and the channel waveguide array 3a; "6" designates an output slab waveguide provided between the channel waveguide array 3a and output channel waveguide 8. A plurality of wedge-shaped curved grooves 20 is formed in the input slab waveguide so that they may cross a traveling direction of the light wave. A filler 21 of silicon resin is buried in the groove 20. A length of the slab waveguide 5, 6 each is 25 mm.

The optical wavelength multiplexer/demultiplexer which are explained above as the embodiments of the invention has the characteristics capable of controlling temperature reliability which has been serious problems in the field. The principal of the temperature-unreliability will be explained below.

The silicon resin which is used as the filler 21 has a minus or negative temperature-reliability of refractive index and hence, the refractive angle of the light wave passing through the curved groove 20 filled with the silicon resin changes according to a temperature change. An in-phase plane is declined due to the temperature change in the vicinity of boundary between the input slab waveguide 5 and the channel waveguide array 3a. The amount of the decline cancels the amount of decline in the in-phase plane made by propagating the channel waveguide array 3a. As a result, the in-phase plane is faced to constant direction without decline, whererby temperature-unreliability in the vicinity of boundary between the input slab waveguide 5 and the channel waveguide array 3a is realized.

Temperature-unreliable conditions will be quantitatively explained. In the optical wavelength multiplexer/demultiplexer, a wavelength $\lambda$ of light wave output from the output channel waveguide 8 provided on symmetrical axis 11 of the output slab waveguide 6 is represented by the formula, $$\lambda = (n_a \Delta L + n_s \delta r)/m \tag{11}$$

wherein "$n_a$" is an effective refractive index of the channel waveguide 3, "$n_s$" is an effective refractive index of the input slab channel waveguide 5, "m" is the number of a diffraction degree, and "$\delta r$" is each length difference of the light wave propagating from the exit E of the input channel waveguide 7 through the input slab waveguide 5 to the entrance I of the channel waveguides 3 in its neighboring waveguide.

The entrance I of all the channel waveguides 3 is substantially same distance from the exit E of the input channel waveguide 7. If the groove 20 does not exist, a distance between the exit E of the input channel waveguide 7 and the entrance I of the channel waveguides 3 is same in every channel waveguide 3, and $\delta r$ becomes 0. In case that the light wave is refractive due to the curved grooves 20 in the embodiment of the invention, and hence, $\delta r$ does not become 0. A temperature coefficient of the wavelength $\lambda$ is represented by the formula by differentiating the formula (11) by T.

$$d\lambda/dT = \Delta L/m[dn_a/dT + n_a \cdot 1/\Delta L \cdot d(\Delta L)/dT + 1/\Delta L \cdot d(n_s \delta r)/dT] \tag{12}$$

Accordingly, the temperature-unreliable condition of $\lambda$ is represented by the formula, $$dn_a/dT + n_a \cdot 1/\Delta L \cdot d(\Delta L)/dT + 1/\Delta L \cdot d(n_s \delta r)/dT] = 0 \tag{13}$$

wherein $d(n_s \delta r)/dT$ is determined by position of the groove, shape of the groove and refractive index of the optical resin filled in the groove.

A position and shape of the curved grooves 20 for the temperature-unreliability are introduced by calculating $(n_s \delta r)/dT$ as follows.

Figure 17:
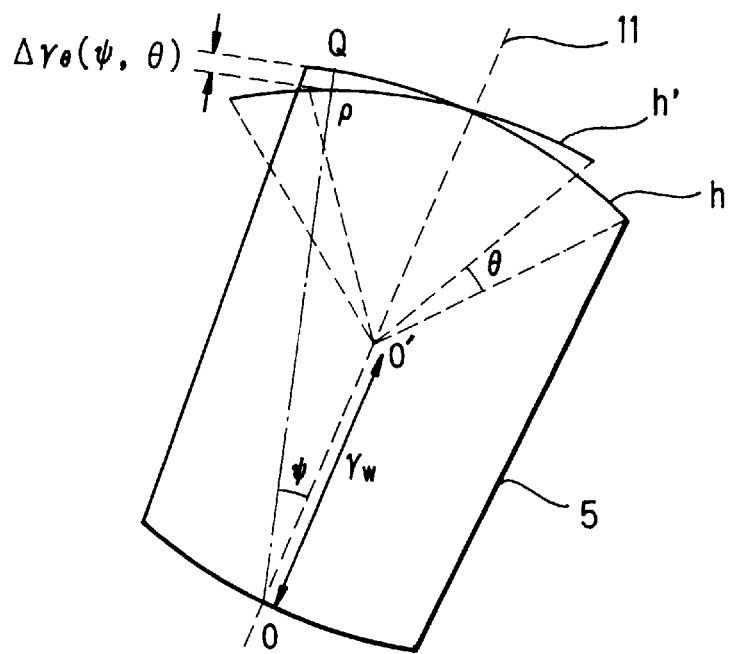
FIG. 17 is an enlarged plan view showing the input slab waveguide of the optical wavelength multiplexer/dimultiplexer shown in FIG. 16.

The input slab waveguide 5 is enlarged in FIG. 17 to introduce $\delta r$. The point "O" corresponds to the exit E of the input channel waveguide 7. An arc "h" is a curve on which the entrance I of the channel waveguides 3 is arranged and if the groove 20 does not exist on the input slab waveguide 7, it is coincident with the in-phase plane of light wave input from the input slab waveguide 7.

In case that the groove 20 is provided in the vicinity of the point "O" and the direction of light wave is rotated by an angle "θ'" based on the point "O'", in-phase plane effective to the arc "h" in which the groove 20 does not exist is an arc "h'" which is obtained by rotating the arc "h" by angle "θ". In case that the angle "θ" is small, the length of light wave from symmetrical axis 11 of the input slab waveguide 5 to the entrance I of the channel waveguides 3 in the direction of an angle "Ψ" increases by $\Delta r \theta(\Psi, \theta)$ which is a distance of the point P and the point Q in comparison with no groove. $\Delta r \theta(\Psi, \theta)$ is represented by the formula.

$$\Delta r \theta(\Psi, \theta) \approx r_w \theta \sin \Psi \tag{14}$$

wherein $r_w$ is a distance of the point "O" and the point "θO" (i.e. from the exit E of the input channel waveguide 7 to the groove 20). In the calculation, the value of θ appears to be quite small in the first degree and is ignored in the second and later degrees. The length difference "δr" of light wave between the neighboring channel waveguides is represented by the formula.

$$\delta r = \Delta r_\theta(\Psi + \Delta\Psi, \theta) - \Delta r_\theta(\Psi, \theta) \approx r_w \theta \Delta\Psi \tag{15}$$

Figure 18:
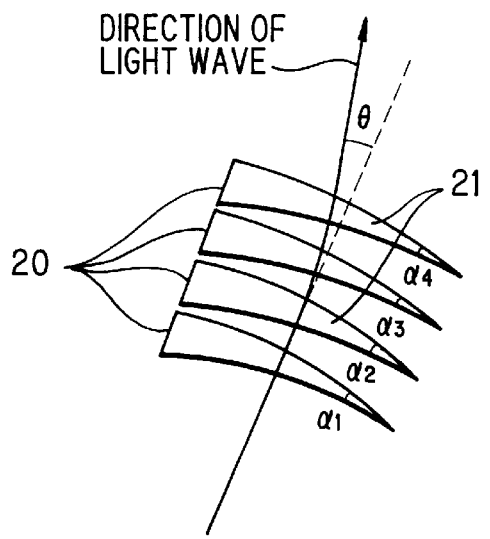
FIG. 18 is an enlarged plan view showing the curved groove of the optical wavelength multiplexer/dimultiplexer shown in FIG. 16.

A rotating angle θ in the traveling direction of light wave by the curved groove will be explained. An enlarged parts of the curved grooves 20 are shown in FIG. 18.

The grooves are filled with filler 21 composed of silicon resin having a refractive index $n_w [\neq n_s$ (a refractive index of materials constituting the input slab waveguide)]. Accordingly, an angle of in-phase plane changes as the light wave is passed through the each groove 20, and the angle θ does not become 0.

$$\theta \approx (n_w + n_s)\alpha/n_s \tag{16}$$

wherein each center angle in "n"-th number of groove is $\alpha_1$, $\alpha_2, \ldots, \alpha_n$, and $\alpha = \alpha_1 + \alpha_2 + \ldots + \alpha_n$. And, $d(n_s \delta r)/dT$ which is obtained by the formulae (15) and (16) is represented by the formula.

$$d\lambda/dT = r_w \Delta\Psi_\alpha [dn_w/dT - dn_s/dT + (n_w - n_s)1/r \, dr_w/dT] \tag{17}$$

The condition of temperature-unreliability with respect to the position $r_w$ of the grooves 20 and the sum α of the center angles is obtained by combination of the formula (13) with the formula (17), and is represented by the formula.

$$r_w \alpha = \Delta L/\Delta\Psi_\alpha \frac{dn_a/dT + n_a \cdot 1/\Delta L \cdot d(\Delta L)/dT}{dn_s/dT - dn_w/dT + (n_s - n_w)1/\Delta L \cdot d(\Delta L)/dT} \tag{18}$$

wherein $1/r \cdot dr_w/dT$ is $1/\Delta L \cdot d(\Delta L)/dT$.

In the parameters of the embodiments, $\Delta L$ is 66.5 [$\mu$m], $\Delta\Psi$ is 0.046 [deg], the material of the light circuit is silica material, $n_a$ and $n_s$ each is nearly 1.45, $dn_a/dT$ and $dn_s/dT$ is nearly $1 \times 10^{-5}$ [°C.$^{-1}$], and $1/\Delta L \cdot d(\Delta L)/dT$ is nearly $5 \times 10^{-7}$ [°C.$^{-1}$]. From the formula (18), the product of the distance $r_w$ between the exit E of the input channel waveguide and the grooves 20, and the sum α of the center angles becomes 128 [deg], in case that $r_w$ is 10 [mm] and α is 12.8 [deg].

Figure 19A:
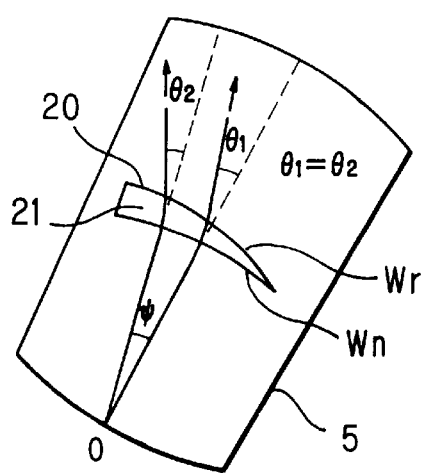
FIG. 19 is illustration view showing behavior of the curved groove, in which (a) is a moving direction of optical wave and (b) is a graph of relationship between a distance to the wall of curved groove and an angle.
Figure 19B:
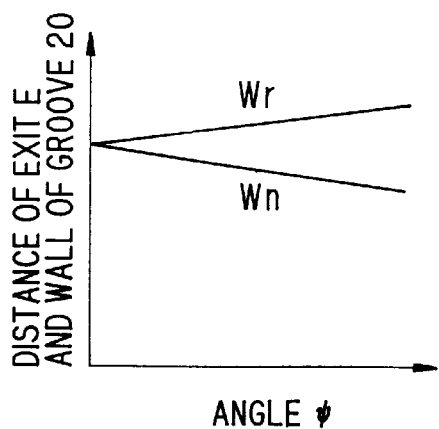

One groove among a plural of the curved grooves 20 is shown in FIG. 19(a). A wall surface Wn which is near the exit E of the input channel waveguide 7 and a wall surface Wf is far from the exit E of the input channel waveguide 7 each has its center of curvature in the vicinity of the exit E of the input channel waveguide 7. In case that an angle Ψ changes from the point "O" which is the position of the exit E of the input channel waveguide 7, a distance from the exit E of the input channel waveguide 7 to the wall surfaces Wn and Wf changes in a straight line as shown in FIG. 19(b).

It is possible that the refractive index θ1 of the light wave propagating in the vicinity of the center of the groove 20 makes equal to the refractive index θ2 of the light wave propagating apart from the center of the groove 20, and hence, it is hard to generate the aberration. As a result, spectrum response of the light wave is kept in substantially same level as in the case with no groove 20.

Figure 20:
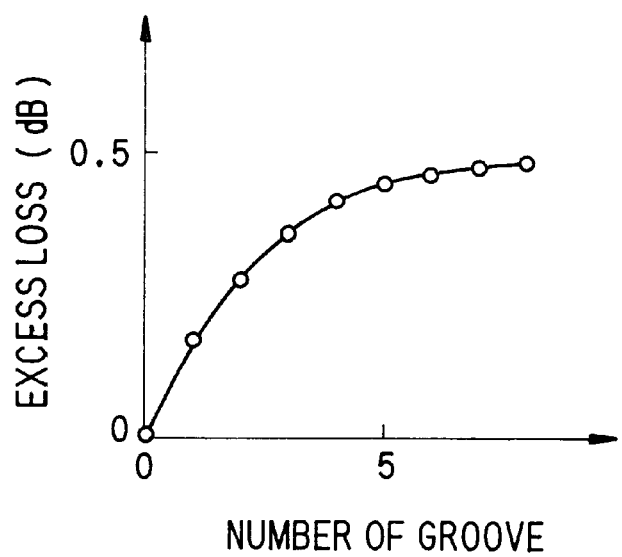
FIG. 20 is a graph showing a relationship between the number of the curved groove and excess loss.

A relationship between the number of the groove 20 and the excess loss is shown in FIG. 20, in case that the sum α of the center angles of the grooves 20 is constant. As the number of the grooves increases, the excess loss increases, but the degree of the increase in excess loss is reduced, as the number of the grooves increases. The reason is that as the number of the grooves increases, the width of each groove is made smaller because the space is limited, and that waveguides between the grooves act as function of lens because the interval between a plural of the grooves is optimized.

Figure 21:
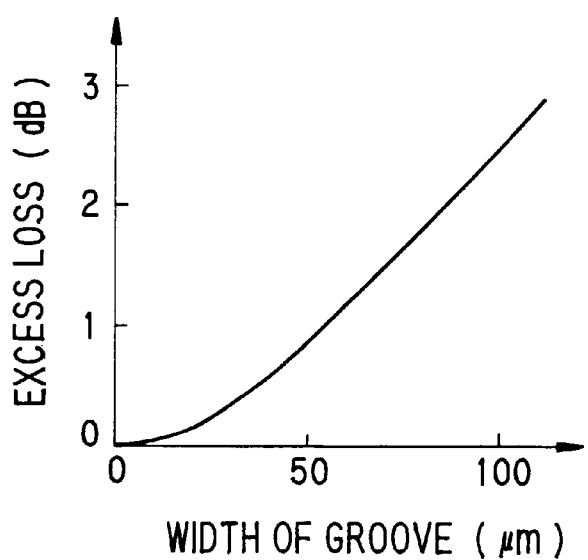
FIG. 21 is a graph showing a relationship between the width of the curved groove and excess loss.

Influences to the excess loss due to the width of the grooves 20 are shown in FIG. 21. As the width of the grooves increases, the excess loss abruptly increases. In case that the sum α of the center angles is same, the light wave emanating in the angle Ψ from the exit E of the input channel waveguide 7 passes through the groove 20 so that total of distances to pass therein is same. Accordingly, as the width of one groove is smaller, total of excess loss can be controlled.

It is the same thing to form excessively more grooves as the fact that the area of the grooves become larger. It should be careful because a distance $r_w$ between the exit E of the input channel waveguide 7 and the predicted position O' of the grooves can not be consistent with actual position to provide the grooves 20. In the embodiment, the number of the grooves 20 is 12 in consideration of the fact.

Figure 22:
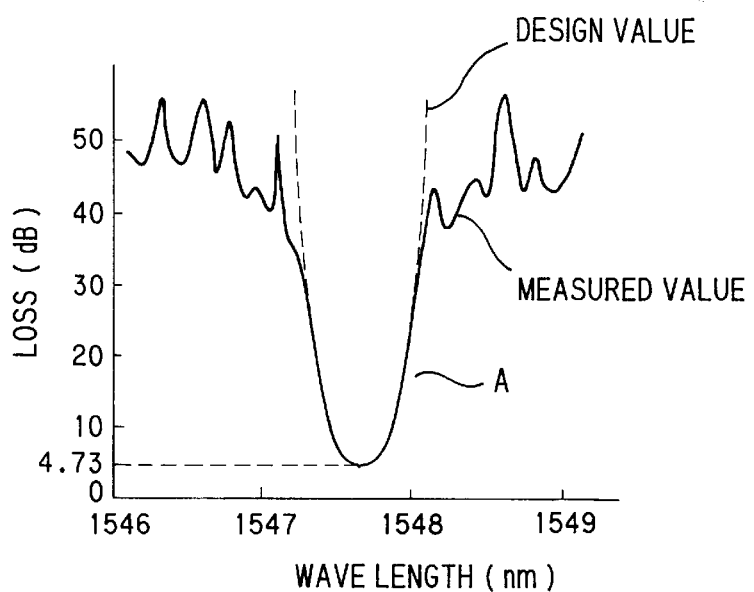
FIG. 22 is a graph showing a relationship between the wavelength and the loss in the fourth embodiment of the invention.

The wavelength loss characteristics in optical wavelength multiplexer/demultiplexer of the embodiment having the above structure are shown with a design value by a beam propagation method in FIG. 22. In FIG. 22, the graph is set so that the minimum loss in the design value is consistent with the minimum loss in the measured value.

According to the graph, the shape of the passing range (main loop) A is substantially same as that of the design value, and the minimum loss (4.7 dB) is low, which is substantially same as the loss (4.3 dB) in the characteristics of optical wavelength multiplexer/demultiplexer with no groove in FIG. 19. It is apparent from FIG. 22 that the advantages are obtained by forming the curved grooves 20 in the input slab channel waveguide 5. Similar advantages can be obtained by forming the curved grooves 20 in the output slab channel waveguide 6.

Figure 23:
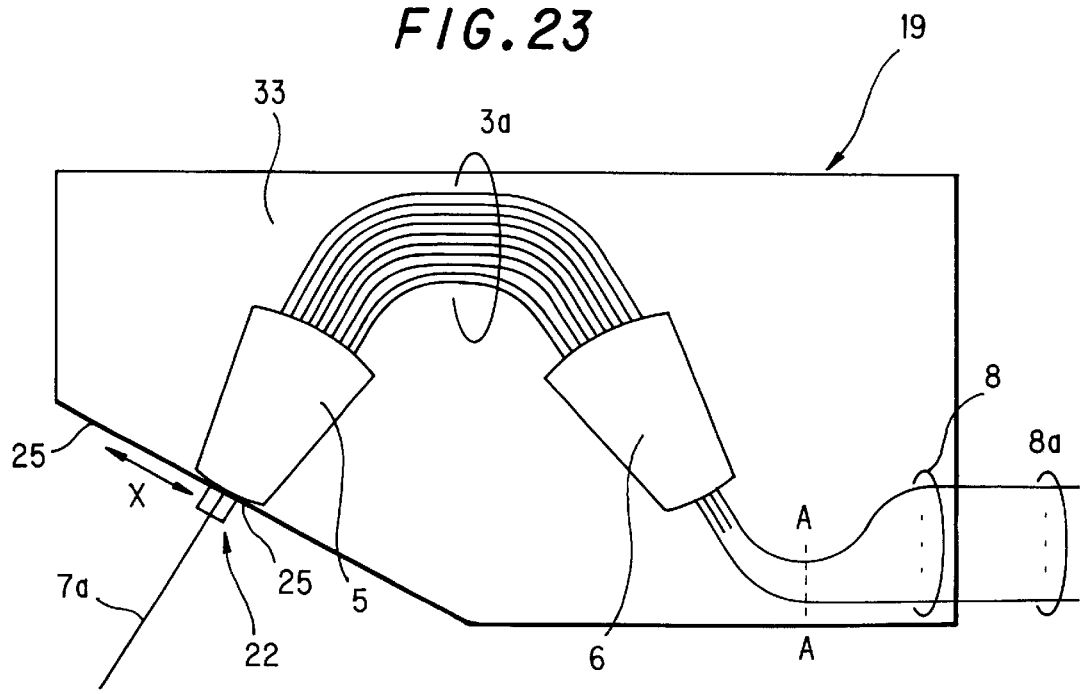
FIG. 23 is a plan view showing the fifth embodiment of the optical wavelength multiplexer/dimultiplexer in the invention.

The fifth embodiment of optical wavelength multiplexer/demultiplexer 19 using channel waveguide array 3a in the invention is shown in FIG. 23.

The optical wavelength multiplexer/demultiplexer 19 is composed of a waveguide element 22 for bandwidth adjustment which is connected to an input optical fiber 7a for inputting wavelength-division multiplex signal lights and in which the waveguides are provided to adjust the band width of the wavelength multiplexed signal, and an element 33 of temperature-unreliable channel waveguide array which is connected to the waveguide element 22 and which outputs the wavelength-division multiplex signal lights to be input from the input optical fiber 7a that is demultiplexed to each channel.

Figure 24:
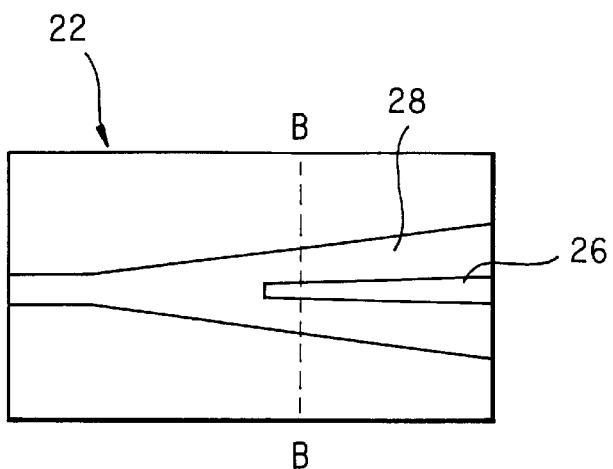
FIG. 24 is an enlarged plan view showing main parts in the optical wavelength multiplexer/dimultiplexer of the invention shown in FIG. 23.
Figure 25:
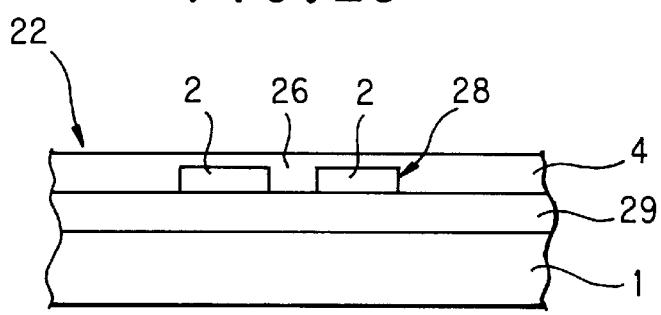
FIG. 25 is a vertical sectional view taken along the line B—B of FIG. 24.

The waveguide element 22 for adjustment of band width is arranged to form a slit-shaped waveguide 28 which is a band width adjustment means as shown in FIGS. 24 and 25. In the slit-shaped waveguide 28, the waveguide core 2 is expanded in the taper form toward the emanating direction of light, and the slit 26 extending to the incident and emanating direction in the center (width) of the core 2 is formed. The slit 26 is formed by covering with the cladding 4.

Figure 26:
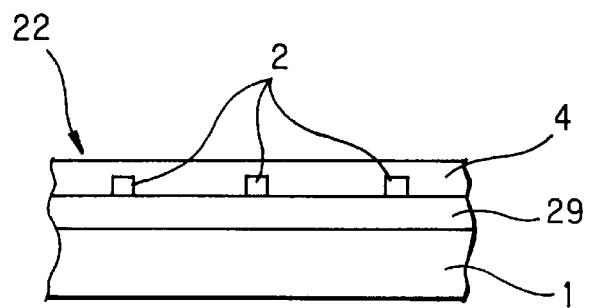
FIG. 26 is a vertical sectional view taken along the line A—A of FIG. 23.

In FIG. 25, the waveguide element 22 is composed of a substrate 1 made of silica, a buffer layer 29 provided thereon, a waveguide core 2 provided on the buffer layer 29 and having a refractive index (1.4692) higher than that of the buffer layer 9, and a cladding 4 provided on the slit-shaped waveguide 26 and having a refractive index (1.4574) lower than that of the core 2. The core 2 is made by using a photolithography and etching method of the covered glass layer, and the cladding 4 is made by using a flame covering method. The waveguide element 22, as illustrated later, is connected to the end surface 25 of the slab waveguide 5 in the element 33 of temperature-unreliable channel waveguide array. In FIG. 26, the element 33 of temperature-unreliable channel waveguide array is composed of a buffer layer 29 provided on a substrate 1, and a waveguide core 2 and a cladding 4 provided on the buffer layer 29 similar to the waveguide element 22. In FIGS. 23 and 26, the element 33 has an input slab waveguide 5 to which an input optical fiber 7a for inputting wavelength-division multiplex signal lights is connectable at the end surface 25 of the substrate 1, a channel waveguide array 3 which is composed of a plurality of channel waveguides differing in length from its neighboring waveguide by a predetermined amount, an output slab waveguide 6 connected to the channel waveguide array 3, and an output channel waveguide 8 connected to the output slab waveguide 6 and separately outputting each of multiplexed signal lights. A connecting position of the input optical fiber 7a to the input slab waveguide 5 is adjustable.

The input slab waveguide 5, the channel waveguide array 3, the output slab waveguide 6 and the output channel waveguide 8 are made by the waveguide core 2, respectively. To the output channel waveguide 8, output optical fibers 8a are connected, respectively.

The channel waveguide array 3 has a groove (not shown) on the waveguides, in which a resin having a temperature coefficient opposite to that of quarts glass is inserted to make it temperature-unreliable.

In order to reduce the amount of reflected lights, connecting end surfaces between the input optical fiber 7a and the element 22, between the element 22 and the element 33 and between the element 33 and the output optical fiber 8a are obliquely grinded at an angle of 8°. The design parameter of the temperature-unreliable wavelength multiplexer-demultiplexer 19 is a demultiplexed interval of 100 GHz and a channel of 16. The multiplexer/demultiplexer is prepared by connecting the waveguide element 22 for band width adjustment to the input optical fiber 7a, connecting the output channel waveguide 8 of the element 33 of temperature-unreliable channel waveguide array to the output optical fiber 8a, and then connecting the element 22 to the input slab waveguide 5a of the element 33 of temperature-unreliable channel waveguide array. In case that the element 22 is connected to the element 33, the element 22 is adjusted in a direction x along the end surface 25 of the slab waveguide 5 and is adhered to the end surface 25 in a position that center wavelength is coincident with each other, while the output light in the output channel waveguides 8 is observed. The transmitting wavelength is filled with the international standard by this detailed adjustment. A wave-form adjustment of the transmitting light is made by optimizing a structure of the waveguide element 22 for band width adjustment, because the element 22 is connected to the slab waveguide 5.

Figure 5:
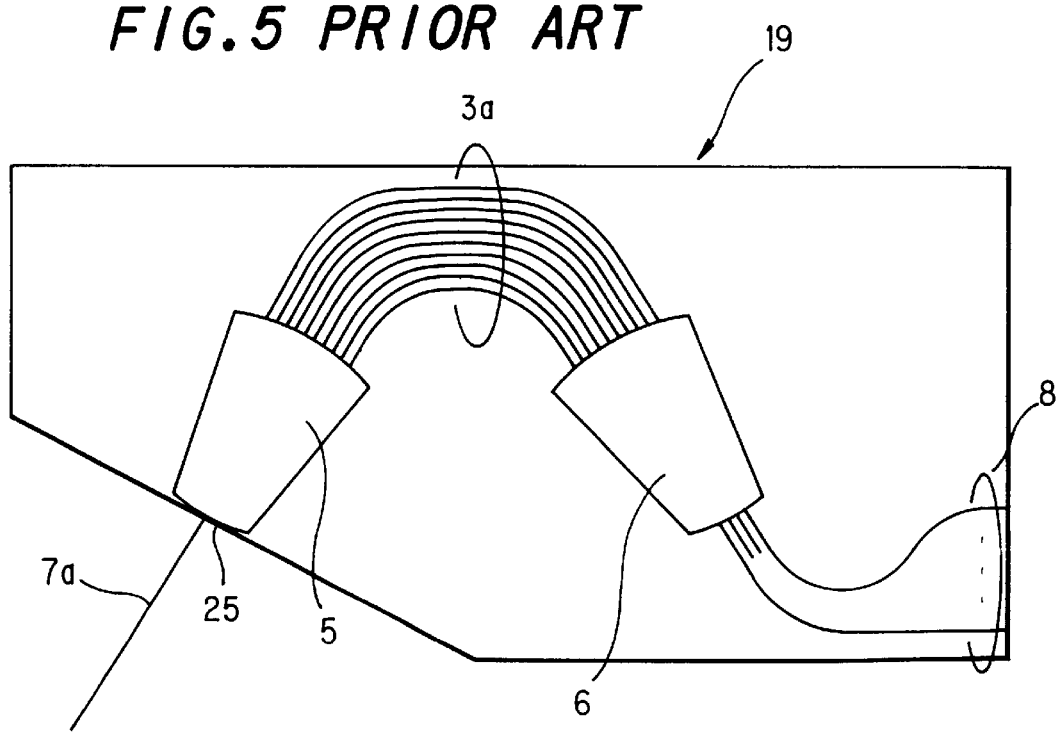
FIG. 5 is a pane view showing other conventional optical wavelength multiplexer/dimultiplexer having the channel waveguide array of temperature unreliability.
Figure 6:
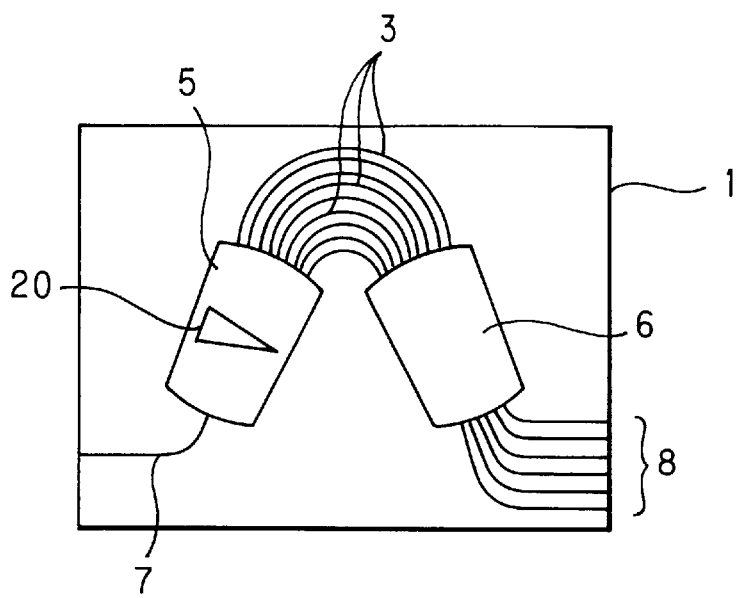
FIG. 6 is a plan view showing still other conventional optical wavelength multiplexer/dimultiplexer.
Figure 7:
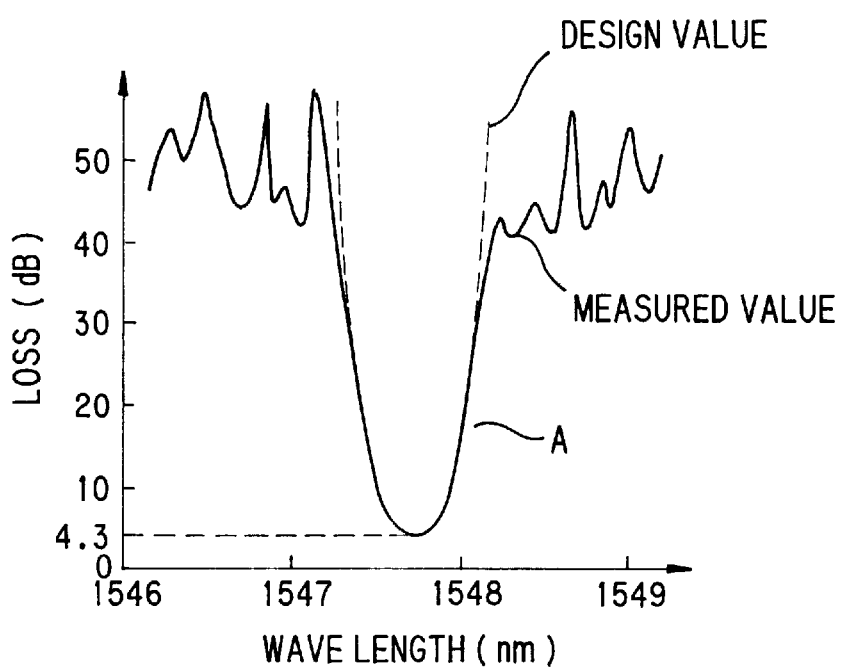
FIG. 7 is a graph showing a relationship between a wavelength and a loss in a conventional optical wavelength multiplexer/dimultiplexer with no groove in output slab waveguide.
Figure 8:
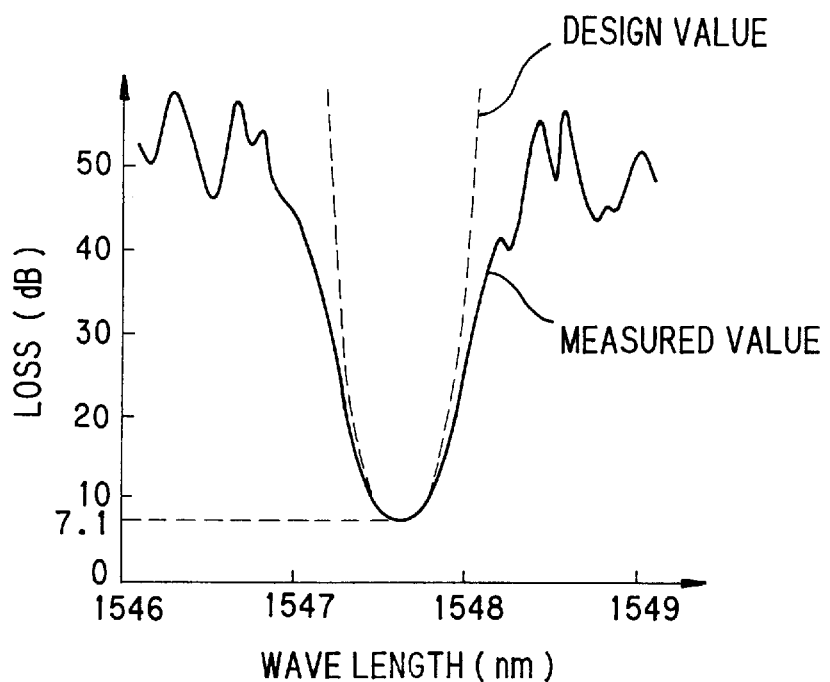
FIG. 8 is a graph showing a relationship between a wavelength and a loss in a conventional optical wavelength multiplexer/dimultiplexer with a groove in output slab waveguide.
Figure 9:
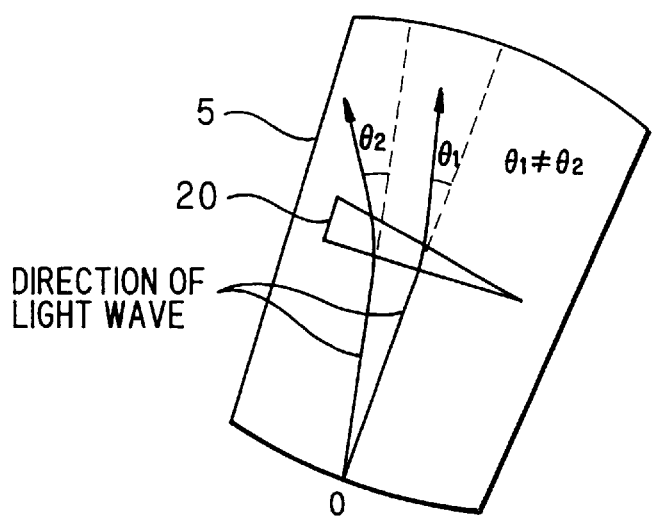
FIG. 9 is a plan view showing spectrum response in a conventional optical wavelength multiplexer/dimultiplexer.
Figure 27:
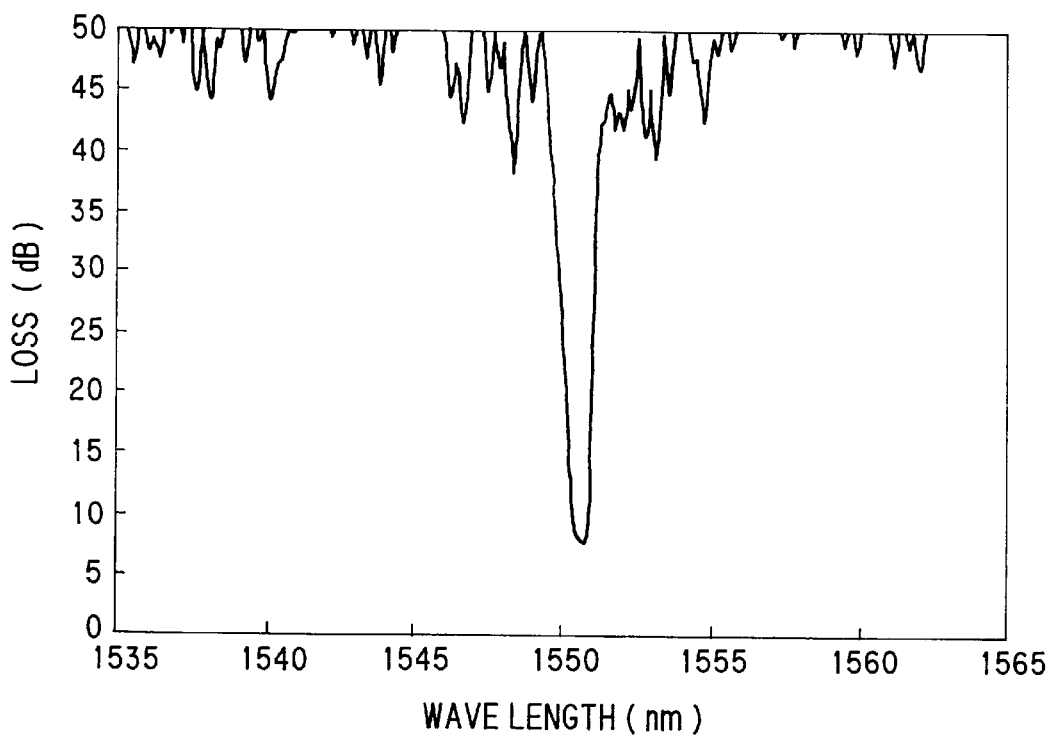
FIG. 27 is a graph showing a relationship between the wavelength and the loss in the fifth embodiment of the invention shown in FIG. 23.

A wave form of flatter loss in a wider band width is obtained by using the slit-shaped in the waveguide for band width adjustment as shown in FIG. 27. It has not been realized by conventional system in which the input optical fiber 7a is directly connected to the end surface of the slab waveguide 25. The wave form obtained by the embodiment of the invention is similar to that of conventional multiplexer/demultiplexer shown in FIG. 5.

Figure 28:
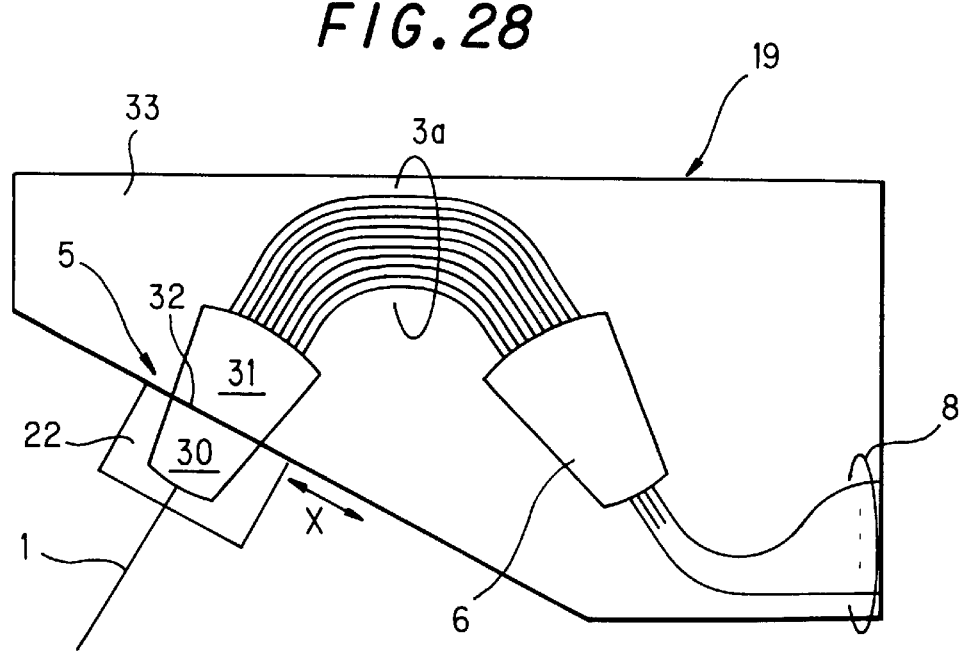
FIG. 28 is a plan view showing the sixth embodiment of the optical wavelength multiplexer/dimultiplexer in the invention.

In the multiplexer/demultiplexer 19 shown in FIG. 28, the waveguide element 22 for band width adjustment and the input slab waveguide 5 are modified. The input slab waveguide 5 is divided into two parts of light incident side and light emanating side. A piece 30 of the light incident side is wholly combined in the waveguide element 22 for band width adjustment and a piece 31 of the element 22 is wholly combined in the element 33 of temperature-unreliable channel waveguide array.

Figure 29:
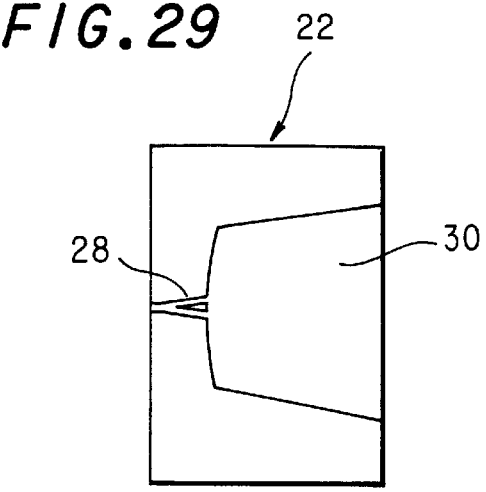
FIG. 29 is an enlarged plan view showing main parts in the optical wavelength multiplexer/dimultiplexer of the invention shown in FIG. 28.

As shown in FIGS. 28 and 29, the waveguide element 22 for band width adjustment is formed by connecting the piece 30 of the light incident side in the input slab waveguide 5 to the emanating side of the slit-shaped waveguide 28. The piece 30 is adhered to the piece 31 while a position is adjusted, and the waveguide element 22 is connected to the wavelength multiplexer/demultiplexer 19 in the input slab waveguide 5.

In the embodiment, a center wavelength is finely adjusted by moving the element 22 in a direction x along the divided surface 32 of the slab waveguide 5 and the slit-shaped bandwidth adjustment means is provided in front of the slab waveguide. The wave form of flatter loss in a wider band width is obtained.

Figure 30:
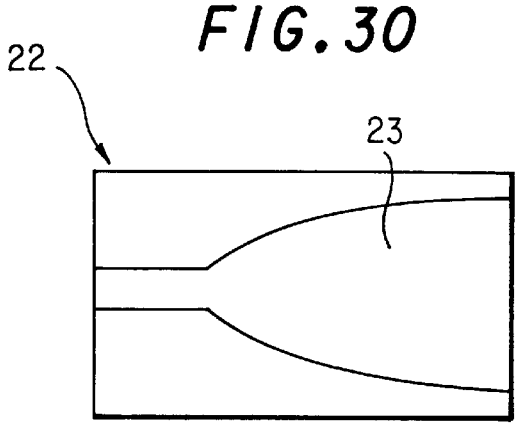
FIG. 30 is a plan view showing parabolic hone-shaped waveguide element for band width adjustment in the invention.
Figure 31:
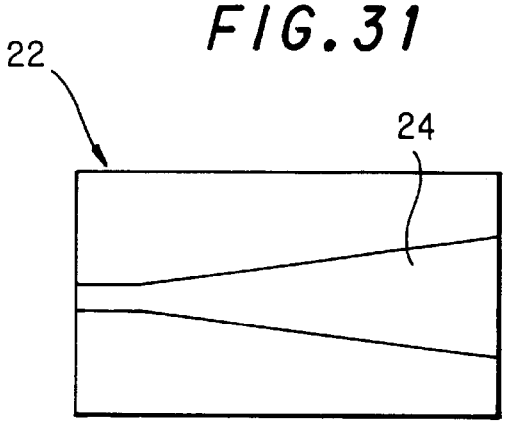
FIG. 31 is a plan view showing taper-shaped waveguide element for band width adjustment in the invention.
Figure 32A:
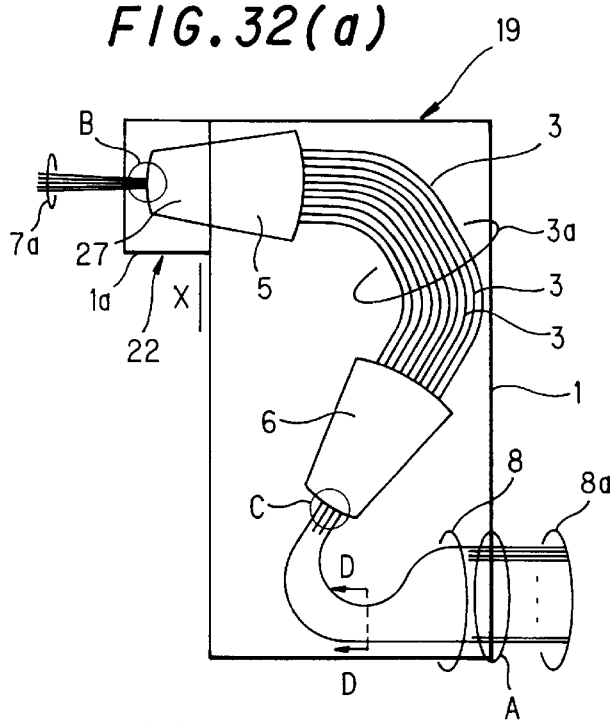
FIG. 32(*a*) is a plan view showing a seventh embodiment of the optical wavelength multiplexer/dimultiplexer in the invention.
Figure 32B:
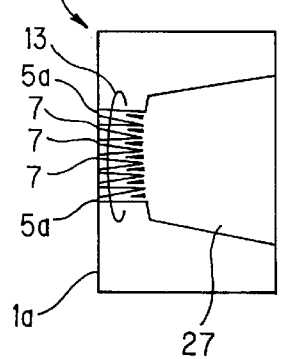
Figure 32C:
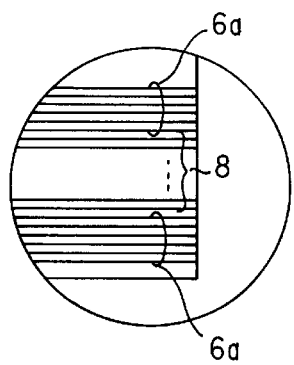
Figure 32D:
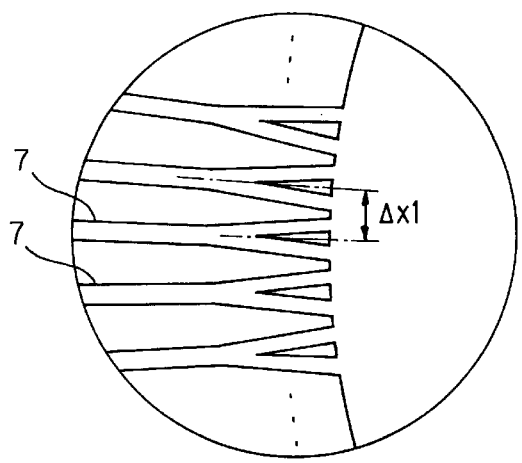
Figure 32E:
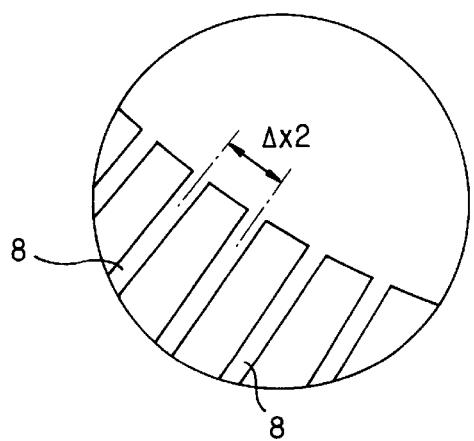
Figure 32F:
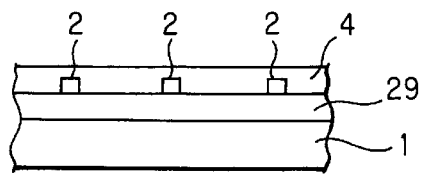

The invention is not limited to the above embodiments in which the slit is introduced into the waveguide element 22 for band width adjustment, but any other band width adjustment means utilizing a distribution of electric field on a boundary of the slab waveguide can be applied to the invention. For example, a parabolichone-shaped waveguide 23 in which the waveguide is expanded to the emanating direction is provided on the element 22 as shown in FIG. 30, and a taper-shaped waveguide in which the waveguide is expanded to the emanating direction is provided on the element 22 as shown in FIG. 31.

The optical wavelength multiplexer/demultiplexer of the sixth embodiment in the invention shown in FIG. 32 is composed of a substrate 1 (e.g. silica substrate), an input slab waveguide 5 to input a wavelength-division multiplex signal light from an input optical fiber 7a, provided on the substrate 1, a channel waveguide array a which is composed of a plurality of waveguides having a waveguide length difference ΔL from its neighboring waveguide and which demultiplexes wavelength-division multiplex signal lights, and an output slab waveguide 6 connected to the array 3a, a plurality of output channel waveguides 8 connected to the output slab waveguide 6 and to output the demultiplexed signal lights to output optical fibers 8a, a waveguide element 22 for band width adjustment provided between the input optical fiber 7a and the input slab waveguide 5 and an additive waveguides 5a, 6a provided in the vicinity of the element 22 for band width adjustment and the output channel waveguide 8. In FIG. 32, the number "29" is a buffer layer, "2" is a waveguide core, and "4" is a cladding.

While the end surface in output side of the input slab waveguide 5 is in the arc form, the input side of the input slab waveguide 5 is in the linear form so that it is same as the surface of the substrate 1.

The waveguide element 22 for band width adjustment is composed of a substrate 1a which is the same material as that of substrate 1, an additive waveguide 5a and input channel waveguide 7, the end of which is connected to an input optical fiber 7a, and an slab waveguide 27 which is connected to the other end of the additive waveguide 5a and input channel waveguide 7. While the end surface in input side of the slab waveguide 27 is in the arc form, the other end surface in the output side of the slab waveguide 27 is in the linear form so that it is same as the surface of the substrate 1a. In the element 22, the core 2 exposed on the end surface in the output side of the slab waveguide 27 is optically connected to the core 2 on the end surface in the input side of the input slab waveguide 5.

According to the multiplexer/demultiplexer 19 of the embodiment in the invention, the element 22 for band width adjustment provided between the input optical fiber 7a and the input slab waveguide 5 is optimized in its position and shape, whereby the wave form adjustment such as broad band width is done. Further, the additive waveguides are provided in the vicinity of the element 22 and the output channel waveguides 8, whereby centerwavelength is accurately set because a combination of the waveguides can be changed even if aberration is in axis when the element is fixed with the input optical fiber 7a and the input slab waveguide 5.

The design parameter of the temperature-unreliable wavelength multiplexer-demultiplexer 19 is a demultiplexed interval of 0.8 nm (100 GHz) and a channel of 16.

A pitch (ΔX1) of the waveguide in the boundary of the waveguide element 22 for band width adjustment and the input slab waveguide 5 is 21 μm, and a pitch (ΔX2) of the waveguide in the boundary of the output slab waveguide 6 and the output channel waveguides 8 is approximately 20 μm. In case that the element 22 is connected to the output slab waveguide 5, aberration of approximately 5 GHz (wavelength of 0.04 nm) in demultiplexed wavelength occurs if position aberration is, for example, 1 μm in a direction x. However, the pitch (ΔX1) of the waveguide in the input channel waveguide 7 is 1.05 times as much as the pitch (ΔX2) of the waveguide in the output channel waveguide 8 and if the input channel waveguide 7 is shifted by one port, light frequency demultiplexed to the output channel waveguides 8 is shifted to approximately 105 GHz (wavelength of 0.84 nm). For the reason, the frequency of several GHz (wavelength of several ten nm) in demulplexed wavelength is finely adjusted. In the embodiment, the total number of the output channel waveguides 8 and the additive waveguides 6a is 13 and the number of the additive waveguides 6a in both sides of the output side is 12. That is, the number of the additive waveguides 6a and the output waveguides 8 to be extended to the output side is 28.

A Y-branch structure is introduced into the waveguide element 22 for band width adjustment to broaden the band width. The element 22 is connected to the output slab waveguide 5 of the optical wavelength multiplexer/demultiplexer using temperature-unrelliable channel waveguide array. The connection of the element 22 is finely adjusted by moving in the direction x to satisfy the transmitting wavelength with the international standard. In order to reduce the amount of reflected lights, connecting end surfaces between the input optical fiber 7a and the element 22, between the element 22 and the input slab waveguide 5 and between the output waveguide 8 and the output optical fiber 8a are obliquely grinded at an angle of 8°.

In the waveguide element 22 for band width adjustment and the optical wavelength multiplexer/demultiplexer, a substrate 1, 1a is silica, a refractive index of the core 2 is 1.4692 and a refractive index of the cladding 4 is 1.4574. The core 2 is made by using a photolithography and a etching method of the covered glass layer, and the cladding 4 is made by using a flame covering method. The substrate 1, 1a is not covered with the buffer layer 29, if the substrate is silica.

Figure 33:
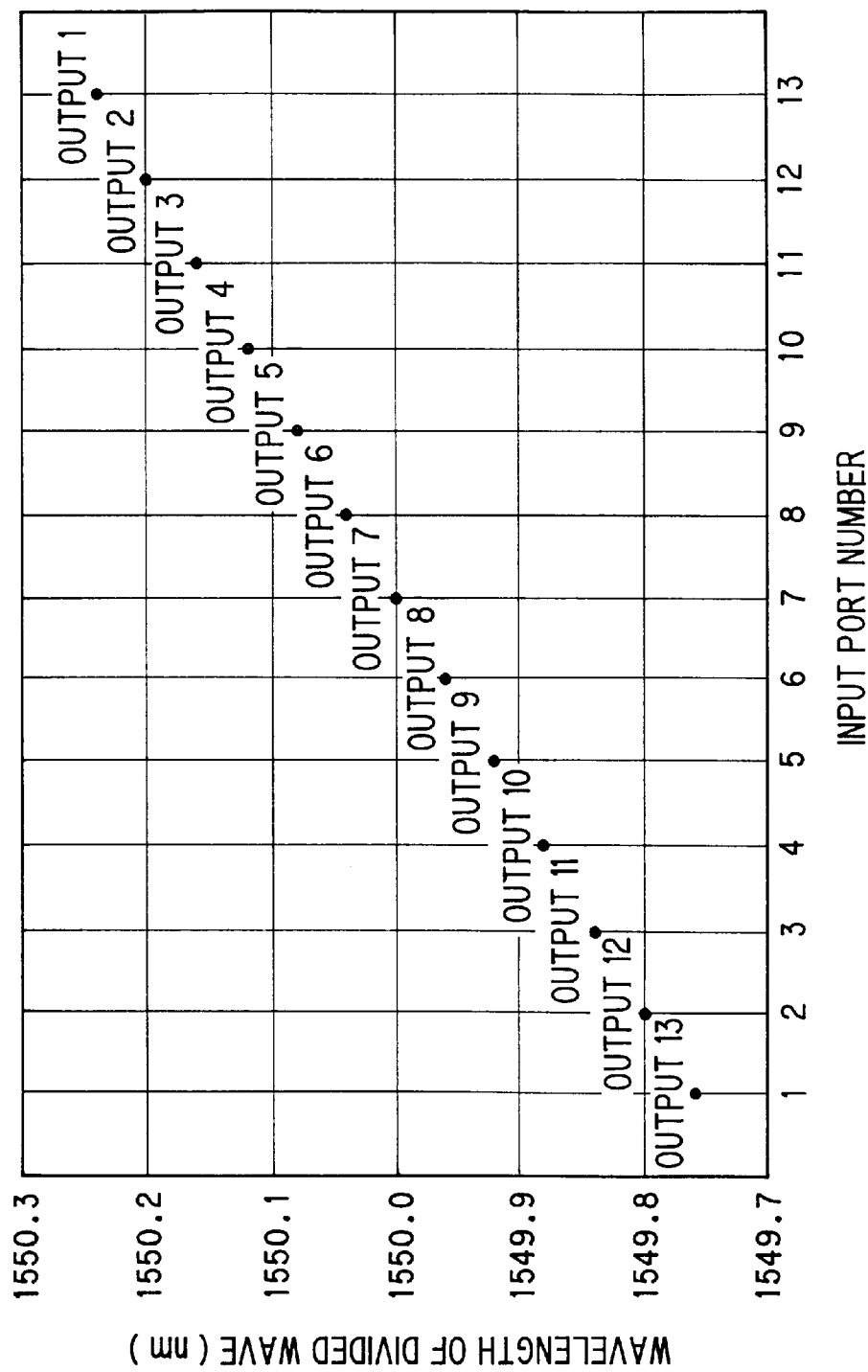
FIG. 33 is a graph showing relationship between the input port number and the wavelength of divided wave of the optical wavelength multiplexer/dimultiplexer in the invention shown in FIGS. 32(*a*) to 32(*f*).
Figure 34:
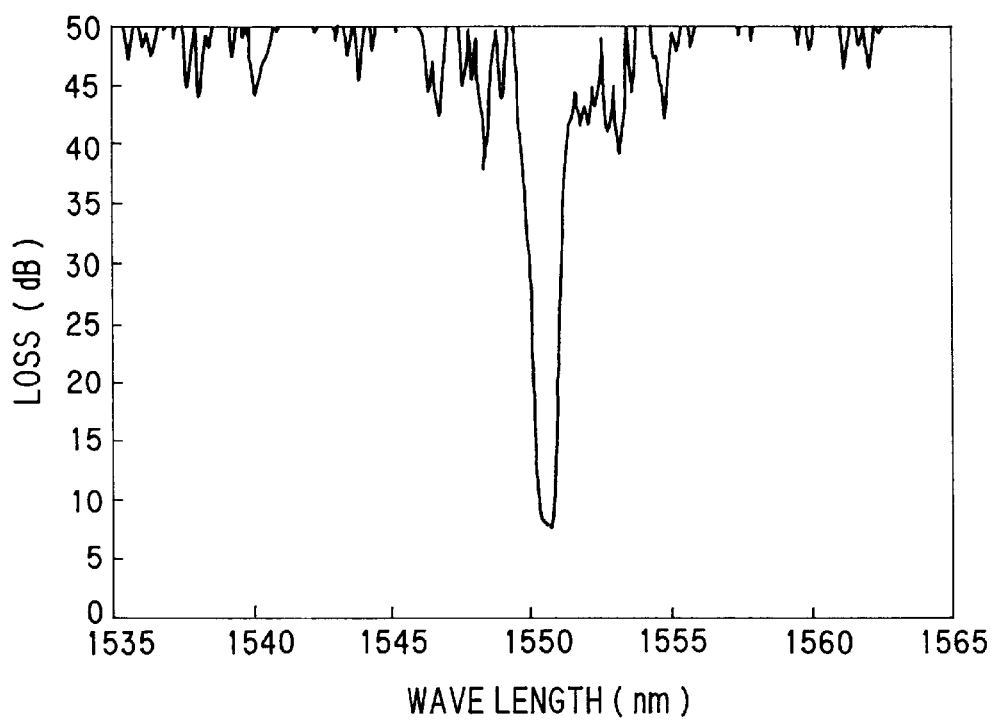
FIG. 34 is a graph showing a relationship between the wavelength and the loss in the optical wavelength multiplexer/dimultiplexer of the invention shown in FIGS. 32(*a*) to 32(*f*).

The detailed adjustment of the center wavelength which has not been realized can be done by selecting a combination of the input and output port to change the transmitting wavelength at a step of approximately 0.04 nm as shown in FIG. 33.

A wave form of flatter loss in a wider band width is obtained by using the Y branch-structure in the waveguide for band width adjustment. It has not been realized by conventional system in which the input optical fiber is directly connected to the end surface of the slab waveguide. The wave form obtained by the embodiment of the invention is similar to that of conventional multiplexer/demultiplexer shown in FIG. 5

Figure 35A:
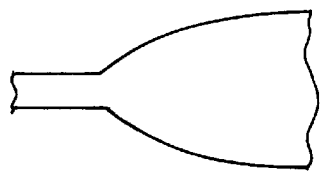
FIGS. 35(*a*) to 35(*c*) are vertical views showing other embodiments of the waveguide element for band width adjustment in the invention shown in FIGS. 32(*a*) to 32(*f*).
Figure 35B:
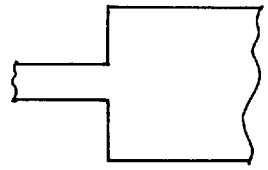
Figure 35C:

The optical wavelength multiplexer/demultiplexer having the demultiplexed interval of 100 GHz and the channel number of 16 is explained as the embodiment of the invention, but the invention is not limited to the embodiment because the demultiplexed interval and the channel number can be optionally varied. Further, a parabolic hone structure as shown in FIG. 35(a), a MMI structure as shown in FIG. 35(b) and a taper structure as shown in FIG. 35(c) can be used instead of the Y branch structure as the wave guide element for band width adjustment.

According to the embodiment of the invention, adjustments such as broadening of the band width are possible by providing the element for band width adjustment provided between the input optical fiber. And, the additive waveguide is provided in the element for band width adjustment, whereby center wavelength is accurately set because a combination of the waveguides can be changed even if aberration is in axis when they are fixed with each other.

As well explained above, the optical wavelength multiplexer/demultiplexer of the invention provides advantages set out below.

According to the first feature of the invention, because the temperature compensation material provided in the light path of the fan-shaped input slab waveguide or the fan-shaped output slab waveguide has a sign of refractive index-temperature change opposite to that of the plurality of the channel waveguides, it functions to cancel the refractive index-temperature change to in the channel waveguide array. Therefore, an angle in the in-phase plane of output light in the channel waveguide array is not changed regardless of the temperature change around the channel waveguide array as well as the case that the filling material is provided in the channel waveguide array. The thickness of the temperature compensation material is less by providing it in the input slab waveguide or output slab waveguide. As a result, the additive loss and cross-talk are reduced.

Further, since the optical resin or the multi-component glass material, each of which corrects an angle change in the in-phase plane of the channel waveguide array due to the temperature change, is provided in the input slab or output slab waveguide, its size is smaller than that in the channel waveguide array. As a result, the additive loss are much reduced. And, a width of groove can be accurately controlled because it is not necessary to provide with the groove in a wide range, whereby deterioration of the cross-talk is much reduced.

According to the second feature of the invention, the input slab waveguide or output slab waveguide containing, in its parts, a curved material capable of canceling the change in the in-phase plane of each wavelength light which occurs in a vicinity of the face between the channel waveguide array and the output slab waveguide, or as the concrete structure, the input slab waveguide or output slab waveguide is composed of a curved groove crossing with the light traveling direction and filled with a filler which has a temperature incline of refractive index different from that of the materials making up the slab waveguide. As a result, the increase of the loss is restrained and the most optimized spectrum response is provided in the optical wavelength multiplexer/demultiplexer.

According to the third feature of the invention, it is finely adjusted to set the center wavelength, and it is realized to optimize the electric field distribution, to expand the bandwidth, to provide the flatter loss and to reduce the cross-talk.

According to the fourth feature of the invention, the optical wavelength multiplexer/demultiplexer capable of providing the flatter loss, accurately adjusting set of the center wavelength and reducing the cross-talk can be provided.

What is claimed is:

1. An optical wavelength multiplexer/demultiplexer comprising;

a substrate;

an input channel waveguide provided on the substrate;

an input slab waveguide of which one end is connected to the input channel waveguide;

a channel waveguide array of which one side is connected to the other side of the input slab waveguide and which has a plurality of channel waveguides, each of the plurality of channel waveguides differing in length from its neighboring waveguide by a predetermined amount;

an output slab waveguide of which one side is connected to the other side of the channel waveguide array; and a plurality of output channel waveguides which are connected to the other side of the output slab waveguide;

wherein said input slab waveguide or output slab waveguide has one of (i) a temperature compensation material, in its light path, having an opposite sign of refractive index-temperature change to the plurality of channel waveguides and (ii) a material capable of canceling a change in an in-phase plane of light having each wavelength which occurs in the vicinity of the channel waveguide array and the slab waveguide, the material capable of canceling the change being provided in a curved form so that it crosses the light traveling direction, and also has a waveguide element for band width adjustment on which a waveguide to adjust band width of wavelength multiplexing light is provided.

2. The optical wavelength multiplexer/demultiplexer according to claim 1, wherein the plurality of channel waveguides are formed of a silica glass which has a positive temperature coefficient, and the temperature compensation material is a multi-component glass or optical resin, which has a negative temperature coefficient.

3. The optical wavelength multiplexer/demultiplexer according to claim 1, wherein the temperature compensation material is a wedge-shaped multi-component glass material which is provided in a light path of the input slab waveguide or output slab waveguide.

4. The optical wavelength multiplexer/demultiplexer according to claim 3, wherein the wedge-shaped multi-component glass material is provided in a slit formed in the input slab waveguide or output slab waveguide.

5. The optical wavelength multiplexer/demultiplexer according to claim 4, wherein the wedge-shaped slit is provided so that it may divide input slab waveguide or output slab waveguide into two in the direction of the light path.

6. The optical wavelength multiplexer/demultiplexer according to claim 3, wherein the wedge-shaped multi-component glass material is provided so that its wider width side is placed in the direction of the longest channel waveguide of the channel waveguide array.

7. The optical wavelength multiplexer/demultiplexer according to claim 3, wherein the substrate is formed of a silica glass or silicon.

8. The optical wavelength multiplexer/demultiplexer according to claim 1, wherein the temperature compensation material is a wedge-shaped optical resin material.

9. The optical wavelength multiplexer/demultiplexer according to claim 8, wherein the optical resin material is a silicon resin or epoxy resin.

10. The optical wavelength multiplexer/demultiplexer according to claim 8, wherein the optical resin material is provided so that its wider width side is placed on the side of the longest channel waveguide of the channel waveguide array.

11. The optical wavelength multiplexer/demultiplexer according to claim 1, wherein the input slab waveguide or output slab waveguide includes at least one curved groove crossing the light traveling direction, and a filler which is filled in the curved groove and which has a temperature-incline of refractive index different from that of the materials making up the input slab waveguide or output slab waveguide including the curved groove.

12. The optical wavelength multiplexer/demultiplexer according to claim 11, wherein the-curved groove is provided so that a center of curvature in the wall surface of the groove exists in the vicinity of the input slab waveguide and the input channel waveguide, or the output slab waveguide and the output channel waveguide.

13. The optical wavelength multiplexer/demultiplexer according to claim 12, wherein the at least one curved groove includes a plurality of curved grooves which are disposed in the light traveling direction.

14. The optical wavelength multiplexer/demultiplexer according to claim 11, wherein the filler is an optical resin including a silicon resin, an epoxy resin and a polymethyl methacrylate resin, or a multi-component glass material including sodium, potassium and calcium.

15. The optical wavelength multiplexer/demultiplexer according to claim 11, wherein the filler is composed of the optical resin, and the input slab waveguide or output slab waveguide which has the curved groove is composed of a silica material.

16. The optical wavelength multiplexer/demultiplexer according to claim 1, wherein the input slab waveguide has the one of (i) the temperature compensation material and (ii) the material capable of canceling the change in the in-phase plane of light having each wavelength and also has the waveguide element for band width adjustment.

17. The optical wavelength multiplexer/demultiplexer according to claim 16, wherein the waveguide element for band width adjustment is provided on an input side of the input slab waveguide.

18. The optical wavelength multiplexer/demultiplexer according to claim 16, wherein the waveguide element for band width adjustment is provided between the input channel waveguide and the input slab waveguide.

19. The optical wavelength multiplexer/demultiplexer according to claim 17, wherein the waveguide of the waveguide element for band width adjustment is in a taper-shape that expands toward a light emanating side.

20. The optical wavelength multiplexer/demultiplexer according to claim 17, wherein the waveguide of the waveguide element for band width adjustment is in a parabolic hone-shape that expands toward a light emanating side.

21. The optical wavelength multiplexer/demultiplexer according to claim 17, wherein the input slab waveguide is divided into two parts, one of the divided parts existing in the entrance side thereof is provided with the waveguide element for band width adjustment, and the other of the divided parts existing in the emanating side thereof is provided on the substrate.

22. The optical wavelength multiplexer/demultiplexer according to claim 19, wherein the waveguide element for band width adjustment is provided with a slit which exists in the waveguide thereof and is expanded in the entrance and emanating direction.

23. The optical wavelength multiplexer/demultiplexer according to claim 18, wherein a plurality of additive waveguides are provided near the waveguide element for band width adjustment and the output waveguide.

24. The optical wavelength multiplexer/demultiplexer according to claim 18, wherein each waveguide is a temperature-unreliable waveguide.

* * * * *